(12) United States Patent
Jackson et al.

(10) Patent No.: US 9,891,651 B2
(45) Date of Patent: Feb. 13, 2018

(54) ROTATABLE INPUT MECHANISM HAVING ADJUSTABLE OUTPUT

(71) Applicant: Apple Inc., Cupertino, CA (US)

(72) Inventors: Benjamin G. Jackson, Cupertino, CA (US); Brenton A. Baugh, Cupertino, CA (US); Megan A. McClain, Cupertino, CA (US); Steven J. Taylor, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/055,554

(22) Filed: Feb. 27, 2016

(65) Prior Publication Data

US 2017/0248986 A1    Aug. 31, 2017

(51) Int. Cl.
| | | |
|---|---|---|
| *G08B 6/00* | (2006.01) | |
| *G05G 5/03* | (2008.04) | |
| *G05G 1/08* | (2006.01) | |
| *G06F 3/01* | (2006.01) | |

(52) U.S. Cl.
CPC ............... *G05G 5/03* (2013.01); *G05G 1/08* (2013.01); *G06F 3/016* (2013.01)

(58) Field of Classification Search
CPC ..... G06F 3/016; G06F 3/01; H01H 2003/008; A63F 13/285; A63F 2300/1037; G05G 5/03; G05G 1/08
USPC ................... 340/407.1, 407.2; 345/173, 184
See application file for complete search history.

(56) References Cited

U.S. PATENT DOCUMENTS

| | | |
|---|---|---|
| 2,237,860 A | 4/1941 | Bolle |
| 2,288,215 A | 6/1942 | Taubert et al. |
| 2,497,935 A | 2/1950 | Feurer |
| 2,771,734 A | 11/1956 | Morf |
| 2,788,236 A | 4/1957 | Kafowi |
| 2,797,592 A | 7/1957 | Marrapese |
| 3,040,514 A | 6/1962 | Dinstman |
| 3,056,030 A | 9/1962 | Kelchner |
| 3,130,539 A | 4/1964 | Davis |
| 3,355,873 A | 12/1967 | Morf |
| 3,410,247 A | 11/1968 | Dronberger |
| 3,495,398 A | 2/1970 | Widmer et al. |
| 3,621,649 A | 11/1971 | Vulcan et al. |
| 3,662,618 A | 5/1972 | Kroll et al. |
| 4,007,347 A | 2/1977 | Haber |
| 4,031,341 A | 6/1977 | Wuthrich et al. |
| 4,037,068 A | 7/1977 | Gaynor |

(Continued)

FOREIGN PATENT DOCUMENTS

| | | |
|---|---|---|
| CH | 1888928 | 1/1937 |
| CN | 1302740 | 9/2001 |

(Continued)

OTHER PUBLICATIONS

Author Unknown, "How Vesag Helps Kids Women and Visitors," http://www.sooperarticles.com/health-fitness-articles/children-health-articles/how-vesag-helps-kids-women-visitors-218542.html, 2 pages, at least as early as May 20, 2015.

(Continued)

*Primary Examiner* — Thomas Mullen

(74) *Attorney, Agent, or Firm* — Brownstein Hyatt Farber Schreck, LLP

(57) ABSTRACT

Disclosed herein is an input device that replicates mechanical actuation of a rotatable input mechanism in such a way that the haptic output provided by the input device is controllable.

19 Claims, 21 Drawing Sheets

(56) References Cited

U.S. PATENT DOCUMENTS

| | | |
|---|---|---|
| 4,077,200 A | 3/1978 | Schneider |
| 4,133,404 A | 1/1979 | Griffin |
| 4,170,104 A | 10/1979 | Yamagata |
| 4,258,096 A | 3/1981 | LaMarche |
| 4,287,400 A | 9/1981 | Kitik |
| 4,289,400 A | 9/1981 | Kubola et al. |
| 4,311,026 A | 1/1982 | Ochoa |
| 4,311,990 A | 1/1982 | Burke |
| 4,324,956 A | 4/1982 | Sakakino et al. |
| 4,345,119 A | 8/1982 | Latasiewicz |
| 4,364,674 A | 12/1982 | Tesch |
| 4,379,642 A | 4/1983 | Meyrat |
| 4,395,134 A | 7/1983 | Luce |
| 4,417,824 A | 11/1983 | Paterson et al. |
| 4,581,509 A | 4/1986 | Sanford et al. |
| 4,600,316 A | 7/1986 | Besson |
| 4,617,461 A | 10/1986 | Subbarao et al. |
| 4,641,026 A | 2/1987 | Garcia, Jr. |
| 4,670,737 A | 6/1987 | Rilling |
| 4,766,642 A | 8/1988 | Gaffney et al. |
| 4,783,772 A | 11/1988 | Umemoto et al. |
| 4,884,073 A | 11/1989 | Souloumiac |
| 4,922,070 A | 5/1990 | Dorkinski |
| 4,931,794 A | 6/1990 | Haag |
| 4,952,799 A | 8/1990 | Loewen |
| 4,980,685 A | 12/1990 | Souloumiac et al. |
| 4,987,299 A | 1/1991 | Kobayashi et al. |
| 5,034,602 A | 7/1991 | Garcia et al. |
| 5,214,278 A | 5/1993 | Banda |
| 5,258,592 A | 11/1993 | Nishikawa et al. |
| 5,288,993 A | 2/1994 | Bidiville et al. |
| 5,347,123 A | 9/1994 | Jackson et al. |
| 5,383,166 A | 1/1995 | Gallay |
| 5,471,054 A | 11/1995 | Watanabe |
| 5,509,174 A | 4/1996 | Worrell |
| 5,572,314 A | 11/1996 | Hyman et al. |
| 5,583,560 A | 12/1996 | Florin et al. |
| 5,631,881 A | 5/1997 | Pessey et al. |
| 5,726,645 A | 3/1998 | Kamon et al. |
| 5,748,111 A | 5/1998 | Bates |
| 5,825,353 A | 10/1998 | Will |
| 5,841,050 A | 11/1998 | Clift et al. |
| 5,847,335 A | 12/1998 | Sugahara et al. |
| 5,867,082 A | 2/1999 | Van Zeeland |
| 5,943,233 A | 8/1999 | Ebina |
| 5,953,001 A | 9/1999 | Challener et al. |
| 5,963,332 A | 10/1999 | Feldman et al. |
| 6,069,567 A | 5/2000 | Zawilski |
| 6,134,189 A | 10/2000 | Carrard |
| 6,154,201 A | 11/2000 | Levin et al. |
| 6,175,679 B1 | 1/2001 | Veligdan et al. |
| 6,246,050 B1 | 6/2001 | Tullis et al. |
| 6,252,825 B1 | 6/2001 | Perotto |
| 6,304,247 B1 | 10/2001 | Black |
| 6,355,891 B1 | 3/2002 | Ikunami |
| 6,392,640 B1 | 5/2002 | Will |
| 6,422,740 B1 | 7/2002 | Leuenberger |
| 6,477,117 B1 | 11/2002 | Narayanaswami et al. |
| 6,502,982 B1 | 1/2003 | Bach et al. |
| 6,525,278 B2 | 2/2003 | Villain et al. |
| 6,556,222 B1 | 4/2003 | Narayanaswami |
| 6,575,618 B1 | 6/2003 | Inoue et al. |
| 6,646,635 B2 | 11/2003 | Pogatetz et al. |
| 6,661,438 B1 | 11/2003 | Billman |
| 6,672,758 B2 | 1/2004 | Ehrsam et al. |
| 6,794,992 B1 | 9/2004 | Rogers |
| 6,809,275 B1 | 10/2004 | Cheng et al. |
| 6,834,430 B2 | 12/2004 | Worrell |
| 6,888,076 B2 | 5/2005 | Hetherington |
| 6,909,378 B1 | 6/2005 | Lambrechts et al. |
| 6,914,551 B2 | 7/2005 | Vidal |
| 6,961,099 B2 | 11/2005 | Takano et al. |
| 6,963,039 B1 | 11/2005 | Weng et al. |
| 6,985,107 B2 | 1/2006 | Anson |
| 6,987,568 B2 | 1/2006 | Dana |
| 6,998,553 B2 | 2/2006 | Hisamune et al. |
| 7,016,263 B2 | 3/2006 | Gueissaz et al. |
| 7,081,905 B1 | 7/2006 | Raghunath et al. |
| 7,102,626 B2 | 9/2006 | Denny, III |
| 7,111,365 B1 | 9/2006 | Howie, Jr. |
| 7,119,289 B2 | 10/2006 | Lacroix |
| 7,135,673 B2 | 11/2006 | Saint Clair |
| 7,167,083 B2 | 1/2007 | Giles |
| 7,244,927 B2 | 7/2007 | Huynh |
| 7,265,336 B2 | 9/2007 | Hataguchi et al. |
| 7,274,303 B2 | 9/2007 | Dresti et al. |
| 7,285,738 B2 | 10/2007 | Lavigne et al. |
| 7,292,741 B2 | 11/2007 | Ishiyama et al. |
| 7,358,481 B2 | 4/2008 | Yeoh et al. |
| 7,369,308 B2 | 5/2008 | Tsuruta et al. |
| 7,371,745 B2 | 5/2008 | Ebright et al. |
| 7,404,667 B2 | 7/2008 | Born et al. |
| 7,465,917 B2 | 12/2008 | Chin et al. |
| 7,520,664 B2 | 4/2009 | Wai |
| 7,528,824 B2 | 5/2009 | Kong |
| 7,545,367 B2 | 6/2009 | Sunda et al. |
| 7,591,582 B2 | 9/2009 | Hiranuma et al. |
| 7,593,755 B2 | 9/2009 | Colando et al. |
| 7,605,846 B2 | 10/2009 | Watanabe |
| 7,634,263 B2 | 12/2009 | Louch et al. |
| 7,646,677 B2 | 1/2010 | Nakamura |
| 7,710,456 B2 | 5/2010 | Koshiba et al. |
| 7,761,246 B2 | 7/2010 | Matsui |
| 7,763,819 B2 | 7/2010 | Ieda et al. |
| 7,772,507 B2 | 8/2010 | Orr |
| 7,778,115 B2 | 8/2010 | Ruchonnet |
| 7,781,726 B2 | 8/2010 | Matsui et al. |
| RE41,637 E | 9/2010 | O'Hara et al. |
| 7,791,597 B2 | 9/2010 | Silverstein et al. |
| 7,856,255 B2 | 12/2010 | Tsuchiya et al. |
| 7,858,583 B2 | 12/2010 | Schmidt et al. |
| 7,865,324 B2 | 1/2011 | Lindberg |
| 8,063,892 B2 | 11/2011 | Shahoian et al. |
| 8,138,488 B2 | 3/2012 | Grot |
| 8,167,126 B2 | 5/2012 | Stiehl |
| 8,169,402 B2 | 5/2012 | Shahoian et al. |
| 8,195,313 B1 | 6/2012 | Fadell et al. |
| 8,248,815 B2 | 8/2012 | Yang et al. |
| 8,263,886 B2 | 9/2012 | Lin et al. |
| 8,263,889 B2 | 9/2012 | Takahashi et al. |
| 8,312,495 B2 | 11/2012 | Vanderhoff |
| 8,368,677 B2 | 2/2013 | Yamamoto |
| 8,371,745 B2 | 2/2013 | Manni |
| 8,373,661 B2 | 2/2013 | Lan et al. |
| 8,410,971 B2 | 4/2013 | Friedlander |
| 8,432,368 B2 | 4/2013 | Momeyer et al. |
| 8,439,559 B2 | 5/2013 | Luk et al. |
| 8,441,450 B2 | 5/2013 | Degner et al. |
| 8,446,713 B2 | 5/2013 | Lai |
| 8,477,118 B2 | 7/2013 | Lan et al. |
| 8,493,190 B2 | 7/2013 | Periquet et al. |
| 8,525,777 B2 | 9/2013 | Stavely et al. |
| 8,568,313 B2 | 10/2013 | Sadhu |
| 8,576,044 B2 | 11/2013 | Chapman |
| 8,593,598 B2 | 11/2013 | Chen et al. |
| 8,607,662 B2 | 12/2013 | Huang |
| 8,614,881 B2 | 12/2013 | Yoo |
| 8,783,944 B2 | 2/2014 | Doi |
| 8,666,682 B2 | 3/2014 | LaVigne et al. |
| 8,704,787 B2 | 4/2014 | Yamamoto |
| 8,711,093 B2 | 4/2014 | Ong et al. |
| 8,724,087 B2 | 5/2014 | Van De Kerkhof et al. |
| 8,730,167 B2 | 5/2014 | Ming et al. |
| 8,743,088 B2 | 6/2014 | Watanabe |
| 8,804,993 B2 | 8/2014 | Shukla et al. |
| 8,824,245 B2 | 9/2014 | Lau et al. |
| 8,847,741 B2 * | 9/2014 | Birnbaum ............... G06F 3/016 340/407.1 |
| 8,859,971 B2 | 10/2014 | Weber |
| 8,860,674 B2 | 10/2014 | Lee et al. |
| 8,863,219 B2 | 10/2014 | Brown et al. |
| 8,878,657 B2 | 11/2014 | Periquet et al. |
| 8,885,856 B2 | 11/2014 | Sacha |
| 8,895,911 B2 | 11/2014 | Takahashi |

(56) References Cited

U.S. PATENT DOCUMENTS

| | | | |
|---|---|---|---|
| 8,905,631 | B2 | 12/2014 | Sakurazawa et al. |
| 8,920,022 | B2 | 12/2014 | Ishida et al. |
| 8,922,399 | B2 | 12/2014 | Bajaj et al. |
| 8,928,452 | B2 | 1/2015 | Kim et al. |
| 8,994,827 | B2 | 3/2015 | Mistry et al. |
| 9,024,733 | B2 | 5/2015 | Wouters |
| 9,041,663 | B2 | 5/2015 | Westerman |
| 9,052,696 | B2 | 6/2015 | Breuillot et al. |
| 9,086,738 | B2 | 7/2015 | Leung et al. |
| 9,105,413 | B2 | 8/2015 | Hiranuma et al. |
| 9,123,483 | B2 | 9/2015 | Ferri et al. |
| 9,176,598 | B2 | 11/2015 | Sweetser et al. |
| 9,202,372 | B2 | 12/2015 | Reams et al. |
| 9,213,409 | B2 | 12/2015 | Redelsheimer et al. |
| 9,223,296 | B2 | 12/2015 | Yang et al. |
| 9,244,438 | B2 | 1/2016 | Hoover et al. |
| 9,277,156 | B2 | 3/2016 | Bennett et al. |
| 9,350,850 | B2 | 5/2016 | Pope et al. |
| 9,430,042 | B2 | 8/2016 | Levin |
| 9,449,770 | B2 | 9/2016 | Sanford et al. |
| 9,607,505 | B2 | 3/2017 | Rothkopf et al. |
| 9,620,312 | B2 | 4/2017 | Ely et al. |
| 9,627,163 | B2 | 4/2017 | Ely |
| 2003/0174590 | A1 | 9/2003 | Arikawa et al. |
| 2004/0082414 | A1 | 4/2004 | Knox |
| 2004/0130971 | A1 | 7/2004 | Ecoffet et al. |
| 2005/0075558 | A1 | 4/2005 | Vecerina et al. |
| 2006/0250377 | A1 | 11/2006 | Zadesky et al. |
| 2007/0013775 | A1 | 1/2007 | Shin |
| 2007/0050054 | A1 | 3/2007 | Sambandam Guruparan et al. |
| 2007/0211042 | A1 | 9/2007 | Kim et al. |
| 2007/0222756 | A1 | 9/2007 | Wu et al. |
| 2007/0247421 | A1 | 10/2007 | Orsley et al. |
| 2008/0130914 | A1 | 6/2008 | Cho |
| 2009/0051649 | A1 | 2/2009 | Rondel |
| 2009/0073119 | A1 | 3/2009 | Le et al. |
| 2009/0079712 | A1* | 3/2009 | Levin .................. G06F 3/016 345/184 |
| 2009/0122656 | A1 | 5/2009 | Bonnet et al. |
| 2009/0146975 | A1 | 6/2009 | Chang |
| 2009/0152452 | A1 | 6/2009 | Lee et al. |
| 2009/0217207 | A1 | 8/2009 | Kagermeier et al. |
| 2009/0285443 | A1 | 11/2009 | Camp et al. |
| 2009/0312051 | A1 | 12/2009 | Hansson et al. |
| 2010/0033430 | A1 | 2/2010 | Kakutani et al. |
| 2010/0053468 | A1 | 3/2010 | Havrill |
| 2010/0081375 | A1 | 4/2010 | Rosenblatt et al. |
| 2010/0149099 | A1 | 6/2010 | Elias |
| 2011/0007468 | A1 | 1/2011 | Burton et al. |
| 2011/0090148 | A1 | 4/2011 | Li et al. |
| 2012/0067711 | A1 | 3/2012 | Yang |
| 2012/0068857 | A1 | 3/2012 | Rothkopf et al. |
| 2012/0075082 | A1 | 3/2012 | Rothkopf et al. |
| 2012/0112859 | A1 | 5/2012 | Park et al. |
| 2012/0113044 | A1 | 5/2012 | Strazisar et al. |
| 2012/0206248 | A1 | 8/2012 | Biggs |
| 2012/0272784 | A1 | 11/2012 | Bailey et al. |
| 2013/0037396 | A1 | 2/2013 | Yu |
| 2013/0087443 | A1 | 4/2013 | Kikuchi |
| 2014/0071050 | A1 | 3/2014 | Armstrong-Muntner |
| 2014/0071098 | A1 | 3/2014 | You |
| 2014/0132516 | A1 | 5/2014 | Tsai et al. |
| 2014/0197936 | A1 | 7/2014 | Biggs et al. |
| 2014/0327630 | A1 | 11/2014 | Burr et al. |
| 2014/0340318 | A1 | 11/2014 | Stringer et al. |
| 2015/0221460 | A1 | 8/2015 | Teplitxky et al. |
| 2015/0227217 | A1 | 8/2015 | Fukumoto |
| 2015/0341031 | A1 | 11/2015 | Marquas et al. |
| 2016/0054813 | A1 | 2/2016 | Shediwy et al. |
| 2016/0058375 | A1 | 3/2016 | Rothkopf et al. |
| 2016/0061636 | A1 | 3/2016 | Gowreesunker et al. |
| 2016/0098016 | A1 | 4/2016 | Ely et al. |
| 2016/0109861 | A1 | 4/2016 | Kim et al. |
| 2016/0116306 | A1 | 4/2016 | Ferri et al. |
| 2016/0168178 | A1 | 6/2016 | Misra |
| 2016/0258784 | A1 | 9/2016 | Boonsom et al. |
| 2016/0259301 | A1 | 9/2016 | Ely |
| 2016/0306437 | A1 | 10/2016 | Zhang et al. |
| 2016/0313703 | A1 | 10/2016 | Ely et al. |
| 2016/0327911 | A1 | 11/2016 | Eim et al. |
| 2016/0378069 | A1 | 12/2016 | Rothkopf et al. |
| 2016/0378070 | A1 | 12/2016 | Rothkopf et al. |
| 2016/0378071 | A1 | 12/2016 | Rothkopf et al. |
| 2016/0378072 | A1 | 12/2016 | Ely et al. |
| 2017/0003655 | A1 | 1/2017 | Ely |
| 2017/0010751 | A1 | 1/2017 | Shedletsky |
| 2017/0045958 | A1 | 2/2017 | Battlogg et al. |
| 2017/0069443 | A1 | 3/2017 | Wang et al. |
| 2017/0069444 | A1 | 3/2017 | Wang et al. |
| 2017/0069447 | A1 | 3/2017 | Wang et al. |
| 2017/0192391 | A1 | 7/2017 | Ely et al. |
| 2017/0307414 | A1 | 10/2017 | Ferri et al. |

FOREIGN PATENT DOCUMENTS

| | | |
|---|---|---|
| CN | 1445627 | 10/2003 |
| CN | 1504843 | 6/2004 |
| CN | 1624427 | 6/2005 |
| CN | 1792295 | 6/2006 |
| CN | 101201587 | 6/2008 |
| CN | 201081979 | 7/2008 |
| CN | 101750958 | 6/2010 |
| CN | 202008579 | 10/2011 |
| CN | 102890443 | 1/2013 |
| CN | 202710937 | 1/2013 |
| CN | 103191557 | 7/2013 |
| CN | 103253067 | 8/2013 |
| CN | 103645804 | 3/2014 |
| CN | 203564224 | 4/2014 |
| CN | 103852090 | 6/2014 |
| CN | 203630524 | 6/2014 |
| CN | 103956006 | 7/2014 |
| CN | 203693601 | 7/2014 |
| CN | 203732900 | 7/2014 |
| CN | 103995456 | 8/2014 |
| CN | 203941395 | 11/2014 |
| CN | 104880937 | 9/2015 |
| CN | 105096979 | 11/2015 |
| CN | 105547146 | 5/2016 |
| DE | 3706194 | 9/1988 |
| DE | 102008023651 | 11/2009 |
| EP | 0556155 | 8/1993 |
| EP | 1345095 | 9/2003 |
| EP | 1669724 | 6/2006 |
| EP | 1832969 | 9/2007 |
| EP | 2375295 | 10/2011 |
| EP | 2720129 | 4/2014 |
| FR | 2030093 | 10/1970 |
| FR | 2801402 | 5/2001 |
| GB | 2433211 | 6/2007 |
| JP | S5734457 | 2/1982 |
| JP | H05203465 | 8/1993 |
| JP | 11121210 | 4/1999 |
| JP | 2001202178 | 7/2001 |
| JP | 2003151410 | 5/2003 |
| JP | 2003331693 | 11/2003 |
| JP | 2004184396 | 7/2004 |
| JP | 2007311153 | 11/2007 |
| JP | 2008053980 | 3/2008 |
| JP | 2008122377 | 5/2008 |
| JP | 2008235226 | 10/2008 |
| JP | 2010186572 | 8/2010 |
| JP | 2011165468 | 8/2011 |
| JP | 2013079961 | 5/2013 |
| KR | 20080045397 | 5/2008 |
| NL | 1040225 | 11/2014 |
| WO | WO2001/022038 | 3/2001 |
| WO | WO2001/069567 | 9/2001 |
| WO | WO2010/058376 | 5/2010 |
| WO | WO2012/083380 | 6/2012 |
| WO | WO2012/094805 | 7/2012 |
| WO | WO2014/018118 | 1/2014 |
| WO | WO2015/147756 | 10/2015 |

(56) References Cited

FOREIGN PATENT DOCUMENTS

OTHER PUBLICATIONS

Author Unknown, "mHealth," http://mhealth.vesag.com/?m=201012, 7 pages, Dec. 23, 2010.
Author Unknown, "mHealth Summit 2010," http://www.virtualpressoffice.com/eventsSubmenu.do?page=exhibitorPage&showId=1551&companyId=5394, 5 pages, Nov. 18, 2010.
Author Unknown, "RedEye mini Plug-in Universal Remote Adapter for iPhone, iPod touch and iPad," Amazon.com, 4 pages, date unknown.
Author Unknown, "Re iPhone Universal Remote Control—Infrared Remote Control Accessory for iPhone and iPod touch," http://www.amazon.com/iPhone-Universal-Remote-Control-Accessory/dp/tech-data/B0038Z4 . . . , 2 pages, at least as early as Jul. 15, 2010.
Author Unknown, "Vesag Wrist Watch for Dementia Care from VYZIN," http://vyasa-kaaranam-ketkadey.blogspot.com/2011/03/vesag-wrist-watch-for-dementia-care.html, 2 pages, Mar. 31, 2011.
Author Unknown, "Vyzin Electronics Private Limited launches Vesag Watch," http://www.virtualpressoffice.com/showJointPage.do?page=jp&showId=1544, 5 pages, Jan. 6, 2011.
Author Unknown, "Vyzin Unveiled Personal Emergency Response System (PERS) with Remote Health Monitoring That Can Be Used for Entire Family," http://www.24-7pressrelease.com/press-release/vyzin-unveiled-personal-emergency-response-system-pers-with-remote-health-monitoring-that-can-be-used-for-entire-family-219317.php, 2 pages, Jun. 17, 2011.
Author Unknown, "DeskThorityNet, Optical Switch Keyboards," http://deskthority.net/keyboards-f2/optical-switch-keyboards-t1474.html, 22 pages, Jul. 11, 2015.
Epstein et al., "Economical, High-Performance Optical Encoders," Hewlett-Packard Journal, pp. 99-106, Oct. 1988. [text only version].
GreyB, "Google Watch: Convert your arm into a keyboard," http://www.whatafuture.com/2014/02/28/google-smartwatch/#sthash.Yk35cDXK.dpbs, 3 pages, Feb. 28, 2014.
IBM, "Additional Functionality Added to Cell Phone via "Learning" Function Button," www.ip.com, 2 pages, Feb. 21, 2007.
Kim, Joseph, "2010 mHealth Summit Emerges as Major One-Stop U.S. Venue for Mobile Health," http://www.medicineandtechnology.com/2010/08/2010-mhealth-summit-emerges-as-major.html, 3 pages, Aug. 26, 2010.
Krishnan et al., "A Miniature Surface Mount Reflective Optical Shaft Encoder," Hewlett-Packard Journal, Article 8, pp. 1-6, Dec. 1996.
Rick, "How VESAG Helps Health Conscious Citizens," http://sensetekgroup.com/2010/11/29/wireless-health-monitoring-system/, 2 pages, Nov. 29, 2010.
Sadhu, Rajendra, "How VESAG Helps People Who Want to 'Be There'?," http://ezinearticles.com/?How-Vesag-Helps-People-Who-Want-to-Be-There?&id-5423873, 1 page, Nov. 22, 2010.
Sadhu, Rajendra, "Mobile Innovation Helps Dementia and Alzheimer's Patients," http://www.itnewsafrica.com/2010/11/mobile-innovation-helps-dementia-andalzheimer%E2%80%99s-patients/, 3 pages, Nov. 22, 2010.
Sherr, Sol, "Input Devices," p. 55, Mar. 1988.
Tran et al., "Universal Programmable Remote Control/Telephone," www.ip.com, 2 pages, May 1, 1992.

\* cited by examiner

US 9,891,651 B2

ROTATABLE INPUT MECHANISM HAVING ADJUSTABLE OUTPUT

FIELD

The described embodiments relate generally to a rotatable input mechanism having an adjustable haptic output. More specifically, the disclosed embodiments relate to an input device that simulates mechanical clicks or other types of haptic output provided by a knob, dial, or other such rotatable input mechanism.

BACKGROUND

Conventional rotary input mechanisms typically include a knob or dial and one or more mechanical detent features that interface with a component of the knob or dial. As the knob or dial rotates, the component of the knob or dial interacts with the mechanical detent features and provides an audible, a tactile, or a haptic feedback. However, the feedback provided by the mechanical detent features is limited by the spacing of the detents and/or how quickly the rotary input mechanism is turned.

Thus, in order to provide more granular output, the mechanical detent features are manufactured such that they are spaced closer together. Likewise, the mechanical detent features must be manufactured such that they are spaced farther apart from one another in order to provide less granular output. In either case, the detents are typically fixed during manufacturing and are invariant.

SUMMARY

Disclosed herein is a rotatable input mechanism that replicates mechanical clicks or other such haptic output provided by a mechanical ball and spring detent mechanism. However, unlike conventional mechanical ball and spring detent mechanisms (or similar mechanisms that provide a haptic output) the rotatable input mechanism described herein includes various components that enable the frequency, strength, and feel of the haptic output to be controllable and adjustable.

More specifically, disclosed herein is a rotatable input mechanism that includes a rotatable structure, a surface within the rotatable structure and a moveable mass. The rotatable input mechanism also includes an actuation mechanism that causes the moveable mass to engage and disengage from the surface, which dynamically changes a torque required to rotate the rotatable structure.

Also disclosed is a user-manipulable rotatable input mechanism. The user-manipulable rotatable input mechanism includes a rotatable structure configured to rotate about an axis and an actuation mechanism defining an engagement surface. In this embodiment, the engagement surface is configured to alternately contact and disengage from the rotatable structure, thereby varying friction between the engagement surface and the rotatable structure to provide a varying haptic output.

The present application also describes an input device having a cover, a feedback mechanism coupled to an inner surface of the cover, and a rotating center plate. The rotating center plate is operable to rotate both with the cover and independently of the cover. The rotating center plate also has one or more detents disposed on a perimeter surface. The detents interact with the feedback mechanism to provide a variable haptic output.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
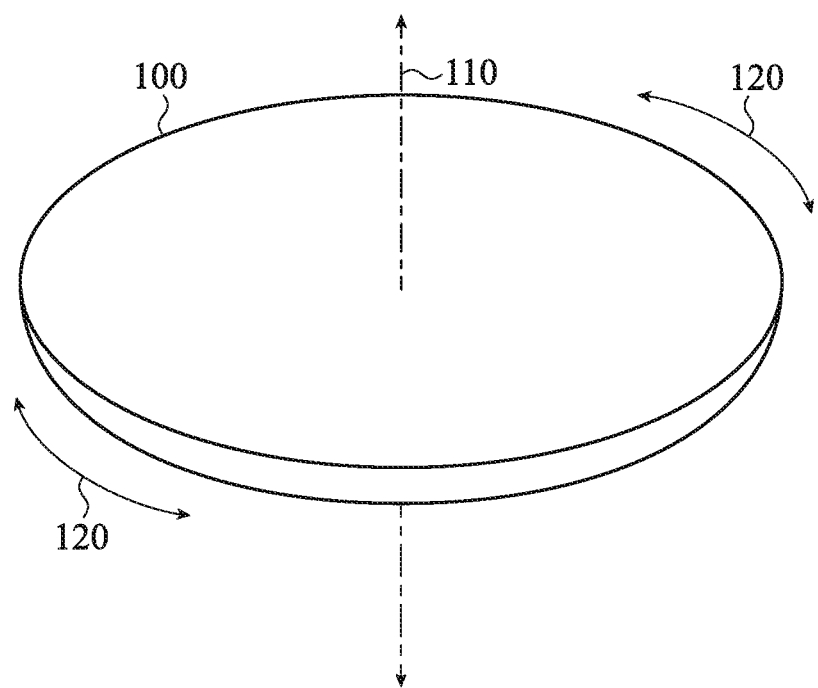
FIG. 1 illustrates an example rotatable input mechanism.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure is directed to a rotatable input mechanism that replicates tactile or haptic output of a conventional rotatable input mechanism. However, unlike conventional rotatable input mechanisms, the haptic output of the rotatable input mechanism of the present disclosure is non-binary. More specifically, a frequency and/or a strength of haptic output provided by the rotatable input mechanism of the present disclosure may be controllable and adjustable. Because the haptic output is non-binary, a continuous range of haptic outputs may be provided to a user. Thus, the rotatable input mechanism may provide a first type of haptic output in a first situation, or in response to a first application, and provide a different type of haptic output in a second situation, or in conjunction with a second application.

"Frequency," as used herein, refers to a number of occurrences per unit of time. Assuming a constant rotational speed of the rotatable input mechanism, an output frequency may be adjusted by dynamically changing a number of detents, impacts simulating detents, friction events, and so on.

The rotatable input mechanism disclosed herein may be a user-manipulable rotatable input mechanism that may be used to navigate through or within a user interface. For example, the user interface may be provided on a display of an electronic device, a display of a computing device, or any other type of display that has selectable icons, features, menu items, applications, images, and the like. As a user manipulates the rotatable input mechanism, the different icons, features, menu items, applications, images, and the like may be highlighted or otherwise selected. In addition, as the user-manipulable rotatable input mechanism is rotated or is otherwise actuated, an audible and/or haptic output may be provided as each of the icons, features, menu items, applications, images, and the like is selected.

As will be explained below, output (whether audible, haptic, or other) may be provided in various ways. In some embodiments, an electromagnet associated with a clutch and spring component increases and/or decreases a torque required to rotate the rotatable input mechanism. The increase and/or decrease in torque simulates or replicates a negative torque and positive assistance torque of, for example, a ball and spring moving in and out of associated detents or notches in a mechanical ball and detent system.

In another embodiment, the rotatable input mechanism includes one or more actuation mechanisms incorporating one or more friction components. The one or more friction components alternate between contacting an inner surface of the rotatable input mechanism and not contacting (e.g., disengaging) the inner surface of the rotatable input mechanism. When the friction component contacts the inner surface of the rotatable input mechanism, the amount of friction is increased. As a result, the torque required to rotate the rotatable input mechanism also increases.

Likewise, when the friction component does not contact the inner surface of the rotatable input mechanism, the amount of friction is decreased. As a result, the torque required to rotate the rotatable input mechanism decreases. The increase and decrease in the friction and the resulting increase and decrease in the required torque may be used to simulate the haptic output of a conventional mechanical ball and spring detent mechanism.

Further, a force exerted on the inner surface by the friction component may be varied in order to vary the resulting friction and thus torque. This, in turn, varies the haptic and/or audible output, or may prevent them entirely.

In yet another embodiment, the rotatable input mechanism may utilize a rotating center plate and a ball and spring component or other such feedback mechanism to provide a programmable haptic output. For example, the rotating center plate may include one or more detents that interact with a ball and spring component or other such feedback mechanism to provide haptic output. The rotating center plate may rotate in a first direction or at a first speed while the ball and spring component may rotate in the first direction (or in a second direction) at a second speed. As each of the components rotate in different directions, the same direction, and/or at different speeds, a variable haptic output may be provided.

In each of the above examples, the increase and decrease in the amount of friction may be programmable. For example, the electromagnet, the actuators, or other components of the rotatable input mechanism may be fired or otherwise activated at various times in order to provide the variable haptic output. For example, a first type of haptic output may be provided by the rotatable input mechanism in response to a user navigating in a first type of user interface, a first type of menu within the first type of user interface, or using a certain application. Likewise, a second type of haptic output may be provided by the same rotatable input mechanism in response to a user navigating through a second user interface, a second menu in the first type of user interface, or using a second application.

Further, due to the programmable nature of the rotatable input mechanism, haptic output may be provided at various rotation points or at various frequencies. For example, the rotatable input mechanism may be programmed or otherwise receive instructions to provide haptic output every quarter of a turn of one revolution of the rotatable input mechanism in one situation, and provide haptic output every half of turn of a revolution of the rotatable input mechanism in a different situation.

These and other embodiments are discussed below with reference to FIGS. 1-13. However, those skilled in the art will readily appreciate that the detailed description given herein with respect to these Figures is for explanatory purposes only and should not be construed as limiting.

FIG. 1 illustrates an example rotatable input mechanism 100. The rotatable input mechanism 100 may be a user-manipulable rotatable input mechanism and may be configured to provide a haptic output and/or audible output when actuated by a user. For example, the rotatable input mechanism 100 may be associated with a user interface of an electronic device. As the user manipulates the rotatable input mechanism 100 to navigate within the user interface, the rotatable input mechanism 100 may provide a haptic and/or audible output as it rotates about its axis 110.

The rotatable input mechanism 100 may bidirectionally rotate about its axis 110 in the direction of arrows 120. Although arrows 120 illustrate that the rotatable input mechanism 100 may bidirectionally rotate about its axis 110, the rotatable input mechanism 100 may be configured to rotate in a single direction (e.g., in a clockwise direction or a counterclockwise direction).

As the rotatable input mechanism 100 rotates, various haptic outputs may be provided. More specifically, the rotatable input mechanism 100 may be configured to provide haptic and/or audible output after various angles or points of rotation. Further, these angles or points of rotation at which the haptic and/or audible output is provided may be dynamically adjustable such that the haptic output is non-binary. In addition, the amount of torque required to rotate the rotatable input mechanism 100 to or past the angles or points of rotation may also dynamically change, for example as friction between the rotatable mechanism and an actuator varies.

FIGS. 2A-2D illustrate various torque response profiles that may be utilized by a rotatable input mechanism such as, for example, rotatable input mechanism 100 of FIG. 1. Although the torque response profiles shown in FIGS. 2A-2D may not be to any particular scale, each of these figures illustrate torque response profiles that show an increase and decrease in the amount of tactile torque (e.g., input torque) required to rotate the rotatable input mechanism to, or past, various angles of rotation.

Figure 2A:
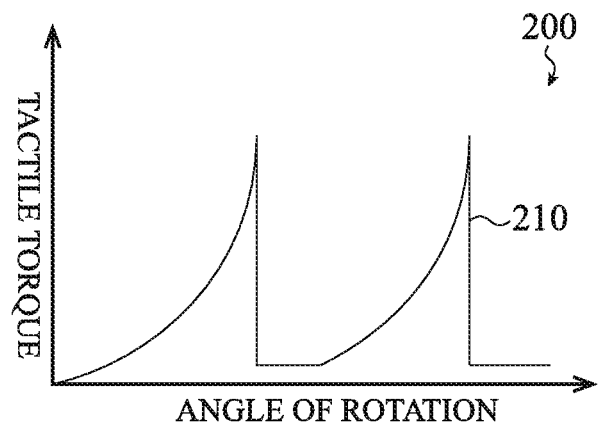
FIG. 2A illustrates a torque response profile showing an increase and decrease in tactile torque as the rotatable input mechanism is rotated according to a first example.

For example, FIG. 2A illustrates a first torque response profile 200. In this example, the profile is represented as a saw-tooth wave 210. In this particular implementation, the torque required to rotate the rotatable input mechanism increases as the angle of rotation of the rotatable input mechanism increases from a zero point. Once a certain angle of rotation has been reached, the amount of torque required to continue rotating the rotatable input mechanism decreases to substantially zero (or some other determined value). If the rotatable input mechanism continues to rotate, the amount of torque continues to increase and decrease in the manner explained above.

Figure 2B:
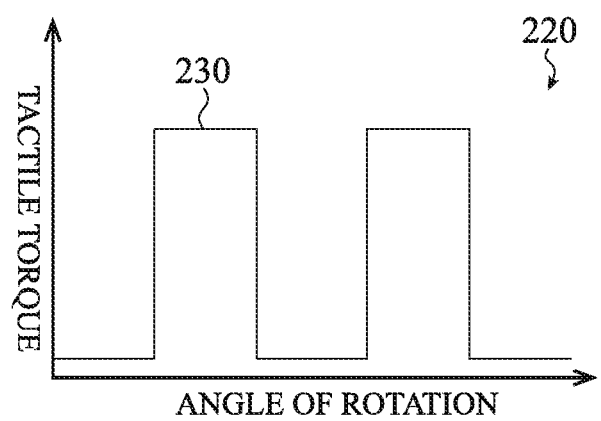
FIG. 2B illustrates a torque response profile showing an increase and decrease in tactile torque as the rotatable input mechanism is rotated according to a second example.

FIG. 2B illustrates a second torque response profile 220. In this example, the profile is represented as a square wave 230. In this particular implementation, the torque required to rotate the rotatable input mechanism increases dramatically at a first angle of rotation, stays constant for a continuous range of angles of rotation, and then decreases to zero or substantially zero (or some other determined value) once the desired angle of rotation has been reached.

Figure 2C:
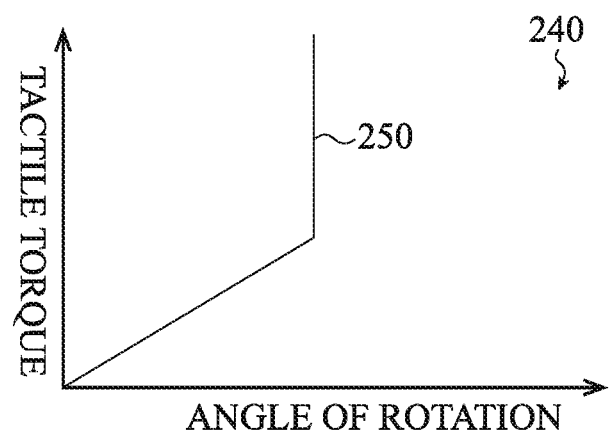
FIG. 2C illustrates a torque response profile showing an increase and decrease in tactile torque as the rotatable input mechanism is rotated according to a third example.

FIG. 2C illustrates a third torque response profile 240. In this particular implementation, the torque required to rotate the rotatable input mechanism linearly increases until a maximum angle of rotation is reached. At that point, the rotatable input mechanism may not be rotated farther and so the force response profile 240 becomes a vertical line 250. This particular part of the torque response profile 240 indicates that the rotatable input mechanism has reached a maximum distance or angle of rotation. As one example, when the rotatable input mechanism is used to navigate within a user interface (such as will be described below) the torque response profile 240 may be used to indicate that an end (or a beginning) of a list has been reached.

Figure 2D:
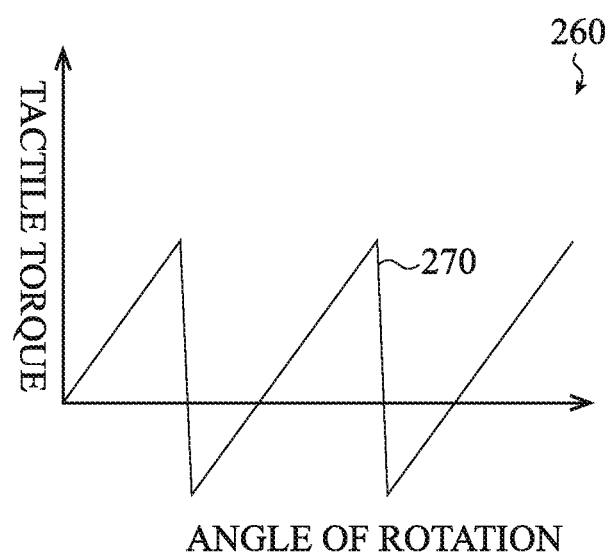
FIG. 2D illustrates a torque response profile showing an increase and decrease in tactile torque as the rotatable input mechanism is rotated according to a fourth example.

FIG. 2D illustrates a fourth torque response profile 260. In this example, the profile is also represented as a saw-tooth wave 270. This example profile is similar to the profile described above with respect to FIG. 2A. For example, the torque required to rotate the rotatable input mechanism increases as the angle of rotation of the rotatable input mechanism increases from a zero point. However, once a certain angle of rotation has been reached, the amount of torque required to continue rotating the rotatable input mechanism decreases to substantially zero, some other determined value, or even a negative torque. The negative torque may cause the rotatable input mechanism to continue to rotate in the initial direction of rotation or may otherwise assist in the rotation of the rotatable input mechanism.

Although specific torque response profiles have been shown and described, various other torque response profiles may be utilized. For example, a profile for a torque response profile may be represented as a sine wave.

Each of the various profiles may be combined or otherwise concatenated with each other. Thus, a first torque response profile may be utilized within a first range of angles of rotation while a second torque response profile may be utilized within a second range of angles of rotation.

Figure 3A:
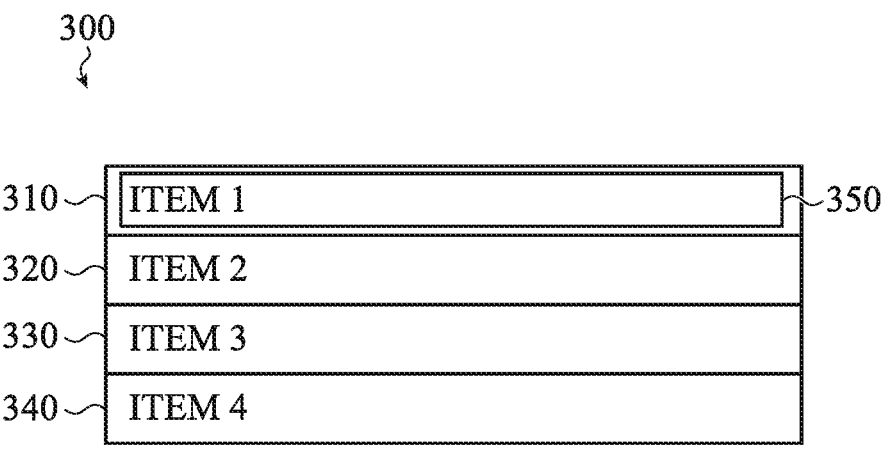
FIG. 3A illustrates an example user interface having a selector that may be moved by the rotatable input mechanism.

FIG. 3A illustrates an example user interface 300 of an electronic device. The user interface 300 has a selector 350 that may be manipulated by a rotatable input mechanism, such as, for example, the rotatable input mechanism 100 of FIG. 1. In this example, the user interface 300 has four different menu items, namely Item 1 310, Item 2 320, Item 3 330 and Item 4 340. As the rotatable input mechanism is manipulated or otherwise rotated to or past a given angle of rotation in a given direction (e.g., clockwise or counterclockwise), the selector 350 may move between the various items. Further, as the given angle of rotation is reached, the amount of force required to rotate the rotatable input mechanism may vary, for example as shown in any of the torque response profiles described above.

For example, when a user rotates the rotatable input mechanism to cause the selector 350 to move from Item 1 310 to Item 2 320, the amount of torque required to rotate the rotatable input mechanism may be represented by the torque response profile 200 (FIG. 2A). As the user continues to manipulate the rotatable input mechanism, selector 350 continues to move from Item 2 320 to Item 3 330 and the same torque response profile 200 may be used.

Figure 3B:
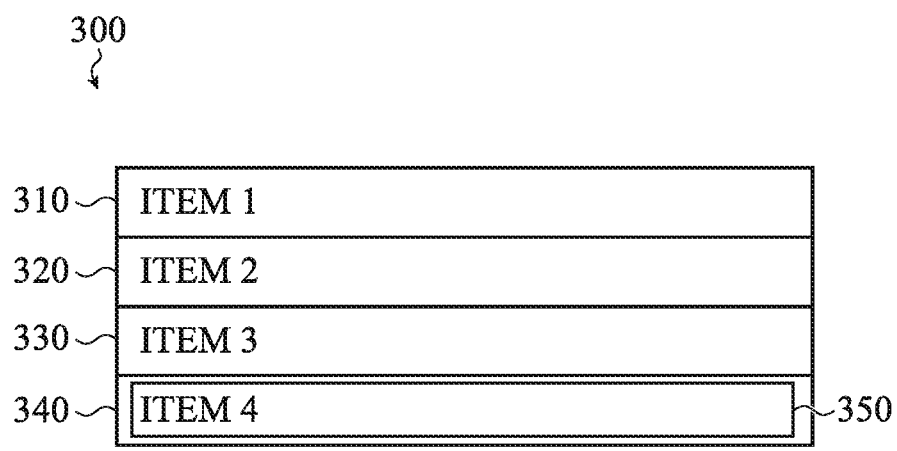
FIG. 3B illustrates the example user interface of FIG. 3A in which the selector has moved as a result of a rotation of the rotatable input mechanism.

In some embodiments, various torque response profiles may be combined together as the rotatable input mechanism is actuated. For example and as shown in FIG. 3B, if the rotatable input mechanism has been rotated such that the selector 350 is on the last item, (Item 4 340), in the user interface 300, torque response profile 240 (FIG. 2C) may be used to indicate that further rotation in the clockwise direction is not available. However, rotation of the rotatable input mechanism in the counterclockwise direction (e.g., moving the selector 350 from Item 4 340 to Item 3 330) may be allowed. The counterclockwise rotation may utilize the torque response profile 200 of FIG. 2A.

In yet another implementation, as the selector 350 moves from Item 3 330 to Item 4 340, the torque response profile 200 (FIG. 2A) may be used. Continued rotation of the rotatable input mechanism may cause the selector 350 to move from Item 4 340 to Item 1 310. As such, torque response profile 220 (FIG. 2B) may be used to indicate that the selector 350 has wrapped around the user interface 300.

In some embodiments, a first direction of rotation and/or a first angle or range of angles of rotation may utilize a first torque response profile while a second direction of rotation and/or a first angle or range of angles of rotation may utilize a second torque response profile. For example, a clockwise rotation of the rotatable input mechanism may utilize torque response profile 200 (FIG. 2A) while a counterclockwise rotation of the rotatable input mechanism may utilize torque response profile 220 (FIG. 2B).

Figure 4A:
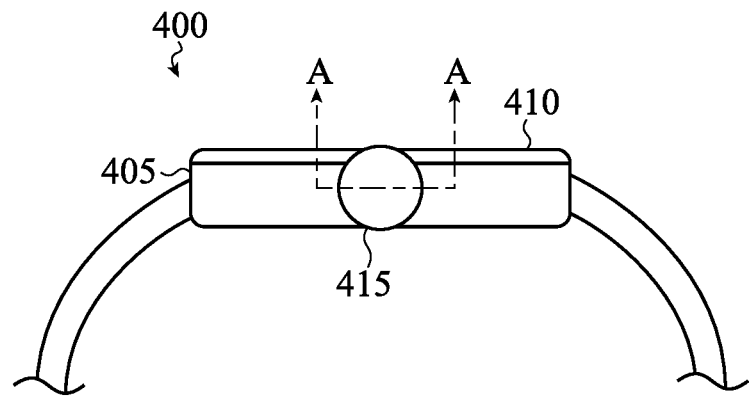
FIG. 4A shows an example electronic device that may use or incorporate a rotatable input mechanism described herein.

FIG. 4A illustrates an example electronic device 400 that uses or incorporates a rotatable input mechanism of the present disclosure. Although the electronic device 400 is shown as a wearable electronic device, the rotatable input mechanism described herein may be used with a variety of electronic devices, mechanical devices, electro-mechanical devices, computing devices, user interfaces, and so on. For example, the electronic device may be a mobile phone (FIG. 4B), a music or other such media player (FIG. 4C) or any other such electronic device.

The electronic device 400 illustrated in FIG. 4A may include a housing 405 and a display 410. The display 410 may be used to output or otherwise provide a user interface to a user. Once the user interface is provided on the display 410, a user-manipulable rotatable input mechanism (represented as rotatable input mechanism 415) may be used by a user to navigate within the user interface.

For example, a user may operate the rotatable input mechanism 415 to alter a user interface that is output on the display 410 of the electronic device 400. More specifically, a displayed element on the graphical user interface may be altered as the rotatable input mechanism 415 is manipulated by a user such as described above with respect to FIGS. 3A-3B. As such, the displayed element may be changed using different manipulations of the rotatable input mechanism 415. These manipulations may include pressing inward on the rotatable input mechanism 415, pulling outward on the rotatable input mechanism 415, rotating the rotatable input mechanism 415 in a first direction (e.g., to the right or clockwise), rotating the rotatable input mechanism 415 in a second direction (e.g., to the left or counterclockwise), and so on. More specifically, the rotatable input mechanism 415 may enable a cursor or other selector to select, zoom in and out, scroll, or otherwise navigate through various icons, menu items, display screens, and the like.

Figure 4B:
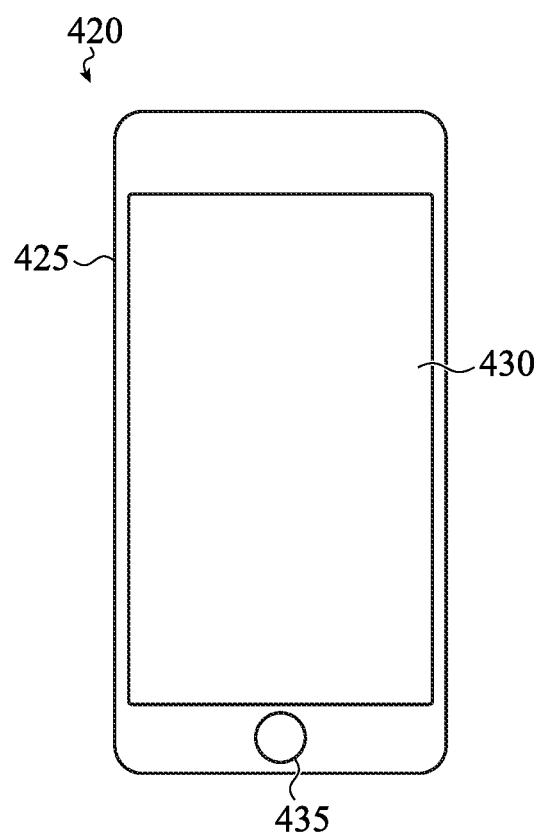
FIG. 4B shows another example electronic device that may use or incorporate a rotatable input mechanism described herein.

Although the rotatable input mechanism 415 is shown in FIG. 4A as extending from the housing 405 of the electronic device 400, this is not required. For example and as shown in FIG. 4B, an electronic device 420, such as, for example, a mobile phone, may have a rotatable input mechanism 435 that is flush or recessed with respect to a housing 425 and/or a display 430. More specifically, the rotatable input mechanism 435 may be flush or recessed with respect to a cover glass or other covering of the display 430 of the electronic device 420.

Figure 4C:
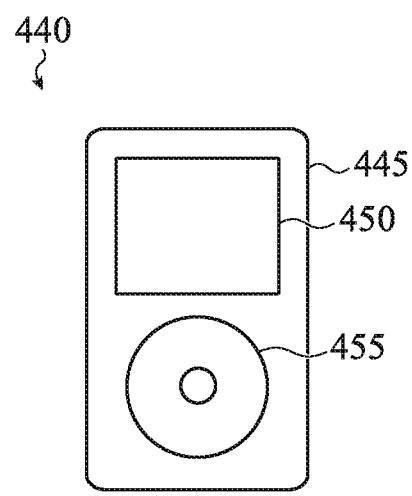
FIG. 4C shows a third example electronic device that may use or incorporate a rotatable input mechanism described herein.

FIG. 4C illustrates another electronic device 440 that may use or otherwise incorporate the rotatable input mechanism disclosed herein. In this embodiment, the electronic device 440 is a portable media player. In this implementation, the electronic device 440 may have a rotatable input mechanism 455 that is flush or recessed with respect to the housing 445. As the rotatable input mechanism 455 is rotated, various icons, menu items, and the like that are output on a display 450 may be selected.

Figure 4D:
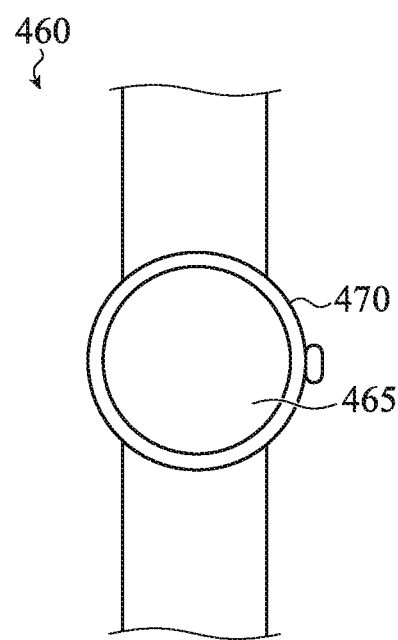
FIG. 4D shows a fourth example electronic device that may use or incorporate a rotatable input mechanism described herein.

FIG. 4D illustrates another example device 460 that may use or incorporate the rotatable input mechanism described herein. In this particular embodiment, the rotatable input mechanism 470 may be configured as a rotatable ring that surrounds a display 465 of the electronic device 460.

Although specific devices have been shown and described, the rotatable input mechanism described herein may be used in a variety of devices. For example, the rotatable input mechanism described herein may be incorporated in any mechanical knob, dial or rotatable switch. Non-limiting examples include radio dials, speaker dials, and so on. Likewise, the rotatable input mechanism may be a rotating crown, a rotating bezel, and so on.

Regardless of the shape, position, or orientation of the rotatable input mechanism, as will be described below, when the rotatable input mechanism is rotated, various components of the rotatable input mechanism may provide an audible and/or a haptic output. "Haptic" as used herein, refers to a perceptible output that may be discerned by an individual that is contacting or otherwise using the rotatable input mechanism. The haptic output may be equivalent to the haptic output provided by a conventional ball and spring mechanical detent system. However, unlike conventional ball and spring mechanical detent systems in which the haptic output is static, the haptic output of the rotatable input mechanism is configurable and adjustable.

FIGS. 5A-12B show various embodiments of example rotatable input mechanisms that may be used with or incorporated into the various devices shown and described above. Further, each of the example rotatable input mechanisms may be user-manipulable rotatable input mechanisms. As such, a user may rotate or otherwise actuate the example rotatable input mechanisms to make a particular selection, change a setting of a device, navigate within or through a user interface and so on such as described herein.

More specifically, FIGS. 5A-8B illustrate various cross-section views of various rotatable input mechanisms, taken along line A-A of FIG. 4A, and FIGS. 9A-12B illustrate various top-down cross-section views of various rotatable input mechanisms according to various embodiments, and any of which may be used within the various devices described herein. Each of the embodiments described below may be used in or with various other mechanical, electro-mechanical and/or computing devices, user interfaces, and so on.

Figure 5A:
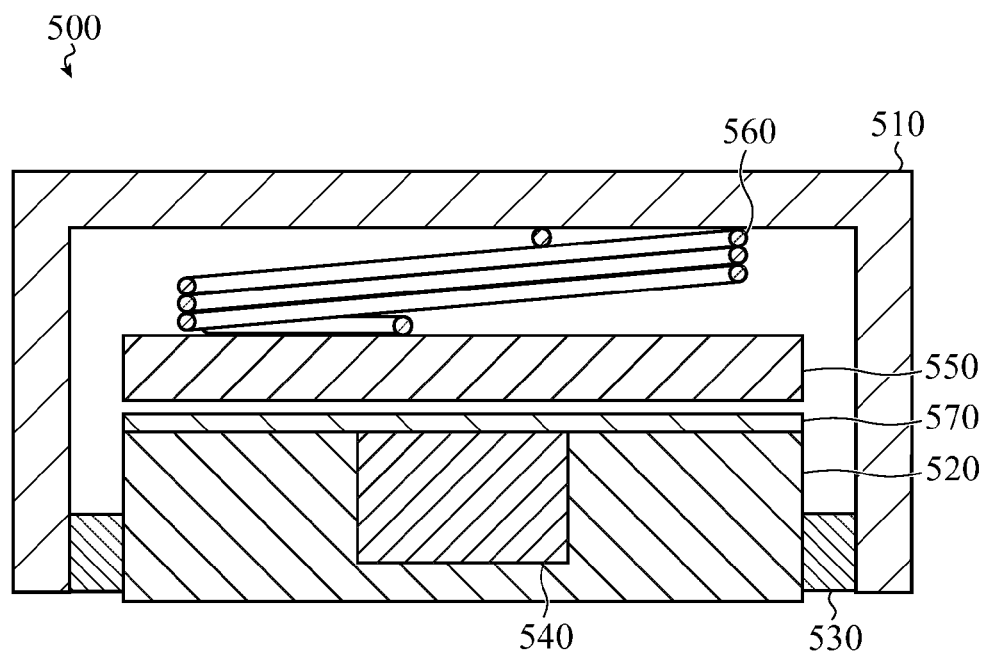
FIG. 5A shows a cross-section view of a rotatable input mechanism in a first state according to a first embodiment.

FIG. 5A shows a cross-section view of a rotatable input mechanism 500 in a first state according to a first embodiment. The rotatable input mechanism 500 may include a rotatable structure 510 positioned over and configured to rotate around a base portion 520. The rotatable structure 510 may have a rounded configuration and include one or more sidewalls that extend from a top surface. In other implementations, the rotatable structure 510 may be a ring that surrounds or partially surrounds the base portion. The rotatable structure 510 may also be a cover or a cap that at least partially overlays one or more surfaces of the base portion 520.

The rotatable structure 510 and/or the base portion 520 may be made from any suitable material including plastic, metal, aluminum, and so on. Although the rotatable structure 510 is shown as a single piece, the rotatable structure 510 may be made from multiple pieces or components.

The rotatable structure 510 may be configured to be manipulated by a user. As such, a user may rotate the rotatable structure 510 in a first direction and/or in a second direction. A shaft may be connected to base portion 520 and/or the rotatable structure 510. As such, the rotatable structure 510 may also be configured to be pressed inwardly and/or pulled outwardly.

As the rotatable structure 510 rotates, a user interface, such as for example, the user interface 300 (FIG. 3A), may be manipulated such as described above. The rotatable input mechanism 500 may also include one or more bearings 530 that are used to maintain spacing and positioning between the rotatable structure 510 and the base portion 520.

The rotatable input mechanism 500 may also include an actuation mechanism, such as, for example, an electromagnet 540. The electromagnet 540 may be flush with, be contained within, disposed on or otherwise coupled to or integrated with the base portion 520. The electromagnet 540 may interact with a moveable mass 550 that is coupled, via a spring component 560, to an inner surface of the rotatable structure 510. In some embodiments, the spring component 560 is a torsion spring. The spring component 560 holds the moveable mass 550 away from a friction surface 570 of the base portion 520. In some embodiments, the spring force of the spring component 560 is greater than the force of gravity on the moveable mass 550, which maintains the spacing between the friction surface 570 of the base portion 520 and the moveable mass 550.

In operation, the rotatable input mechanism 500 simulates haptic output of a mechanical spring ball and detent mechanism. For example, prior to or when the rotatable structure 510 is rotated, the electromagnet 540 is activated. In some examples, the electromagnet 540 may be activated or otherwise controlled by a voltage (e.g., analog voltage), a pulse width modulation scheme, or other such control mechanism.

Figure 5B:
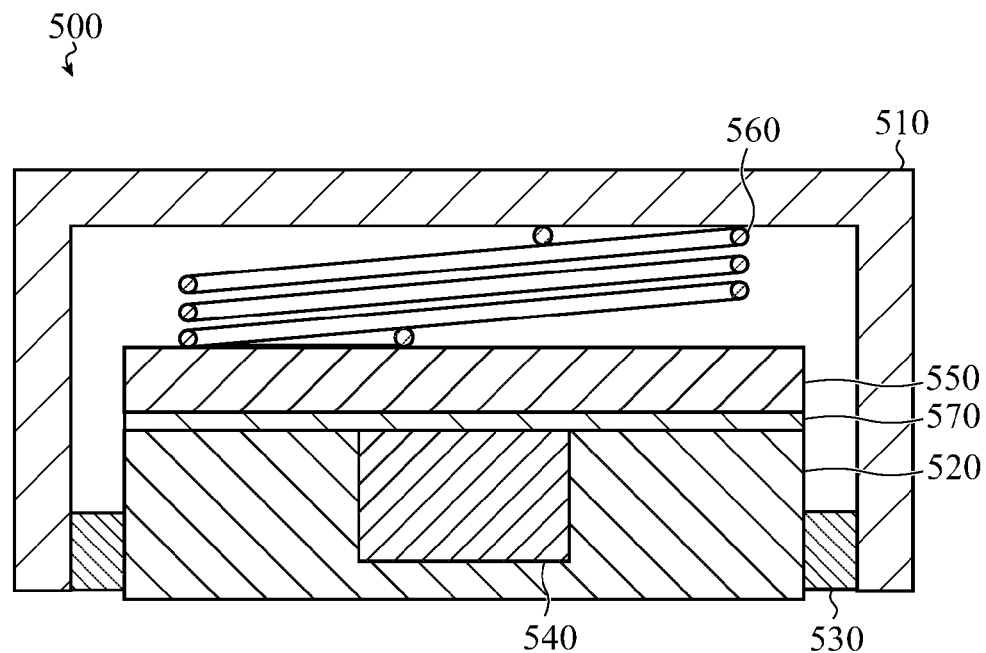
FIG. 5B shows a cross-section view of the rotatable input mechanism of FIG. 5A in a second state.

Activation of the electromagnet 540 causes the moveable mass 550 to move from its nominal position (e.g., a position in which the moveable mass 550 is suspended from the spring component 560 such as shown in FIG. 5A) to a second position in which the moveable mass 550 is magnetically coupled to or otherwise engages with the base portion 520 such as shown in FIG. 5B. As the rotatable structure 510 rotates, the electromagnet 540 holds the moveable mass 550 in place or otherwise prevents the moveable mass 550 from rotating with the rotatable structure 510. In some embodiments and as briefly described above, the base portion 520 includes a friction surface 570 that increases friction between the moveable mass 550 and the base portion 520 which also helps prevent the moveable mass 550 from rotating as the rotatable structure 510 is rotated.

Figure 5C:
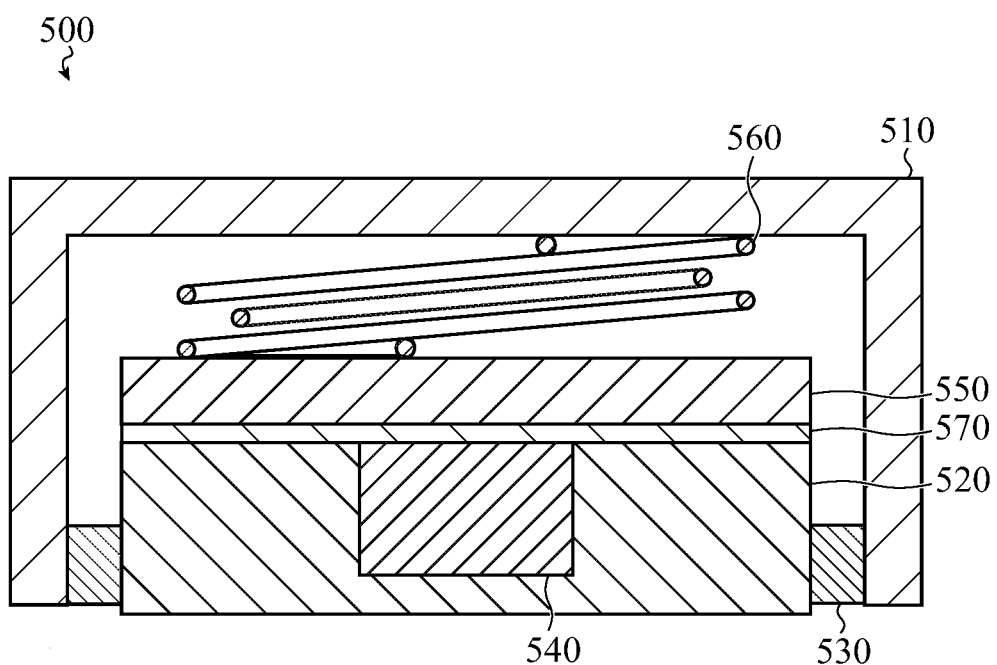
FIG. 5C shows a cross-section view of the rotatable input mechanism of FIG. 5A in which a spring component of the rotatable input mechanism exhibits increased tension as a result of the rotatable input mechanism being rotated.

Because the spring component 560 is coupled to both the moveable mass 550 and the rotatable structure 510, as the rotatable structure 510 rotates and the moveable mass 550 remains stationary or substantially stationary, the spring component 560 experiences an increase in tension such as shown in FIG. 5C. As the tension in the spring component 560 increases, the user feels an increase in resistance, which replicates a negative resistance torque of a conventional ball and spring detent mechanism.

In some implementations, an increase in magnetic attraction between the moveable mass 550 and the base portion 520 can dynamically increase the friction between the two components. As such, the haptic output that is provided by the rotatable input mechanism 500 may dynamically change. Accordingly, the rotatable input mechanism 500 may provide non-binary haptic output. For example, a current increase through the electromagnet 540 increases a magnetic force between the moveable mass 550 and the base portion 520. This increases the friction and torque which affects the feel of the rotation of the rotatable structure 510.

Once a sufficient or desired torque requirement over a given amount of time or rotation distance of the rotatable structure 510 has been met or otherwise achieved, the electromagnet 540 may be deactivated. Once the electromagnet 540 has been deactivated, the moveable mass 550 disengages from the friction surface 570 and moves from the second position back to its nominal position.

Because the moveable mass 550 is now free to move and rotate, the tension in spring component 560 is released. As the tension in the spring component 560 is released, the moveable mass 550 rotates which simulates the positive assistance torque of a conventional ball and spring detent mechanism. More specifically, when the moveable mass 550 is released, the spring component 560 accelerates movement of the moveable mass 550 back to its nominal state (whether such movement is rotational, translational, or a combination of the two) thereby simulating the positive assistance torque described above.

Because the moveable mass 550 may wobble or otherwise exhibit undesired movement when released, the electromagnet 540 may be activated at various times and for various durations in order to reduce or eliminate wobble or other such undesired movement. For example, once the electromagnet 540 is deactivated and the moveable mass 550 returns to its nominal state, the electromagnet 540 may be activated a second time to stabilize the moveable mass 550.

In other implementations, the electromagnet 540 may be activated using various pulses to slow, stabilize, or otherwise stop the moveable mass 550 from rotating or otherwise moving. Activation of the electromagnet 540 in this way may also produce a haptic and/or an audible output.

Although a single electromagnet 540 is shown, multiple electromagnets 540 may be used. In such embodiments, the electromagnets 540 may be positioned at various locations and geometries within the base portion 520.

Figure 6A:
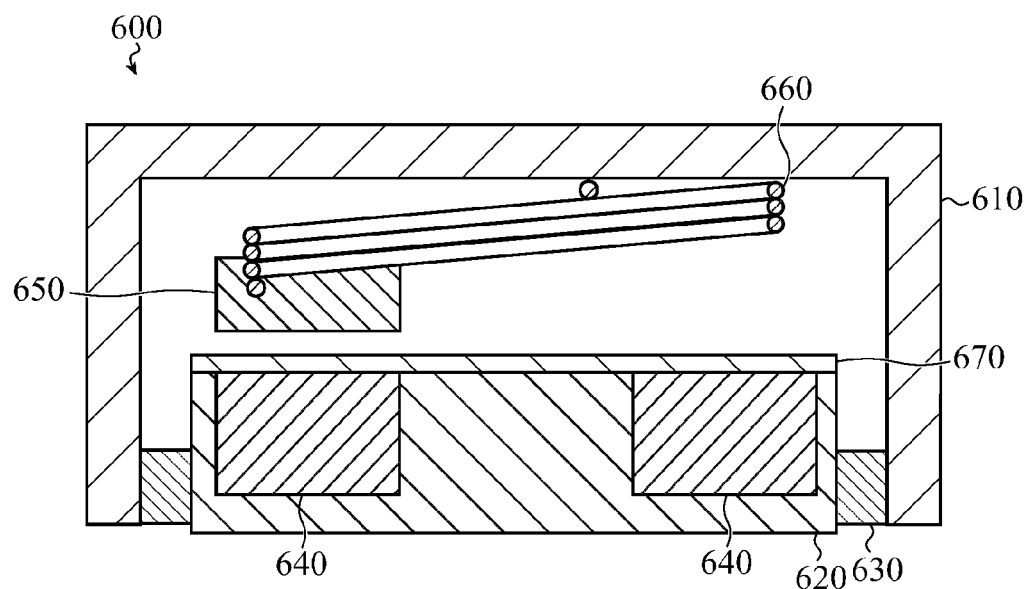
FIG. 6A shows a cross-section view of a rotatable input mechanism in a first state according to a second embodiment.

FIG. 6A shows a cross-section view of a rotatable input mechanism 600 in a first state according to a second embodiment. The rotatable input mechanism 600 may include similar features and function in a similar manner to the rotatable input mechanism 500 described above. More specifically, the rotatable input mechanism 600 may include a rotatable structure 610 that rotates around a base portion 620. The spacing between the rotatable structure 610 and the base portion 620 may be maintained by one or more bearings 630.

The rotatable input mechanism 600 may also include an actuation mechanism, such as, for example, an electromagnet 640. The rotatable input mechanism 600 may also include a moveable mass 650 coupled to a spring component 660. However, in this particular embodiment, the moveable mass 650 is offset from a center axis of the rotatable input mechanism 600 and the electromagnet 640 has an annular shape. In this embodiment, the moveable mass 650 may be smaller than the electromagnet 640. As such, the moveable mass 650 may be configured to move around a perimeter of the electromagnet 640.

Figure 6B:
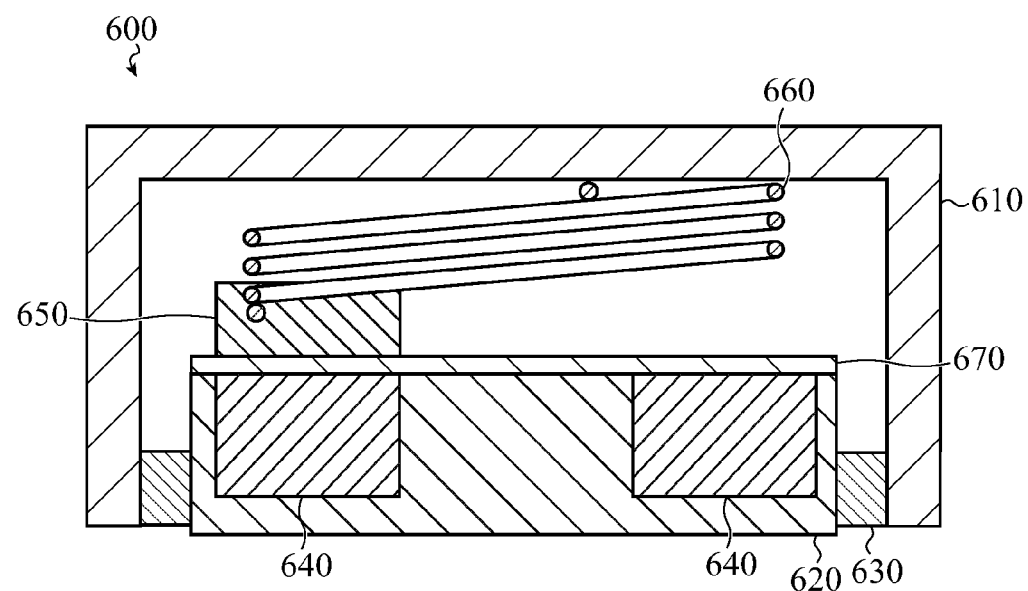
FIG. 6B shows a cross-section view of the rotatable input mechanism of FIG. 6A in a second state.
Figure 6C:
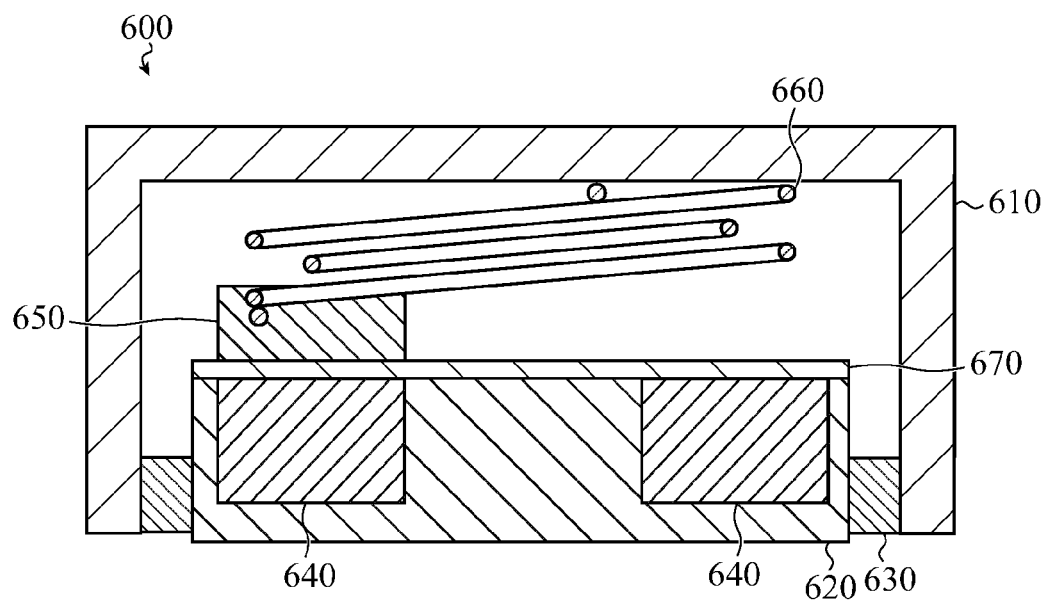
FIG. 6C shows a cross-section view of the rotatable input mechanism of FIG. 6A in which a spring component of the rotatable input mechanism exhibits increased tension as a result of the rotatable input mechanism being rotated.

For example, when the electromagnet 640 is activated, the moveable mass 650 engages with or is otherwise magnetically coupled to a friction surface 670 of the base portion 620, such as shown in FIG. 6B. As the rotatable structure 610 rotates, the moveable mass 650 may be maintained at its current position and the spring component 660 experiences an increase in tension such as shown in FIG. 6C. In another implementation, the moveable mass 650 may be dragged or may otherwise move along the top surface of the friction surface 670 tracing the perimeter of the annular electromagnet 640. In such implementations, the spring component 660 may also experience an increase in tension.

As described above, an increase in an attractive force between the moveable mass 650 and the base portion 620 increases the friction between these components, at least once the moveable mass 650 contacts the base portion 620. As the amount of friction between the components increases, the amount of torque required to rotate the rotatable input mechanism 600 also increases, which alters the haptic output provided by the rotatable input mechanism 600. Likewise, if the amount of friction between the components decreases, the amount of torque required to rotate the rotatable input mechanism 600 decreases, which also alters the haptic output provided by the rotatable input mechanism. Accordingly, the haptic output is non-binary and may be dynamically alterable.

Regardless of the implementation, the rotatable input mechanism 600 may be used to provide a haptic output that simulates a turning sensation of a conventional dial or other such ball and spring detent mechanism such as described above with respect to FIGS. 5A-5C. Specifically, when the electromagnet 640 is deactivated, the tension in the spring component 660 is released, the moveable mass disengages from the friction surface 670 and the moveable mass 650 returns to its nominal state.

Although a circular electromagnet 640 is described, the electromagnet 640 may have a variety of shapes and sizes. Further, the electromagnet 640 may be made up of a series of electromagnets 640 divided into quadrants or other sections. In such an implementation, each quadrant may have a different polarity or may otherwise interact with the moveable mass 650 in a particular way that varies the haptic output.

Figure 7A:
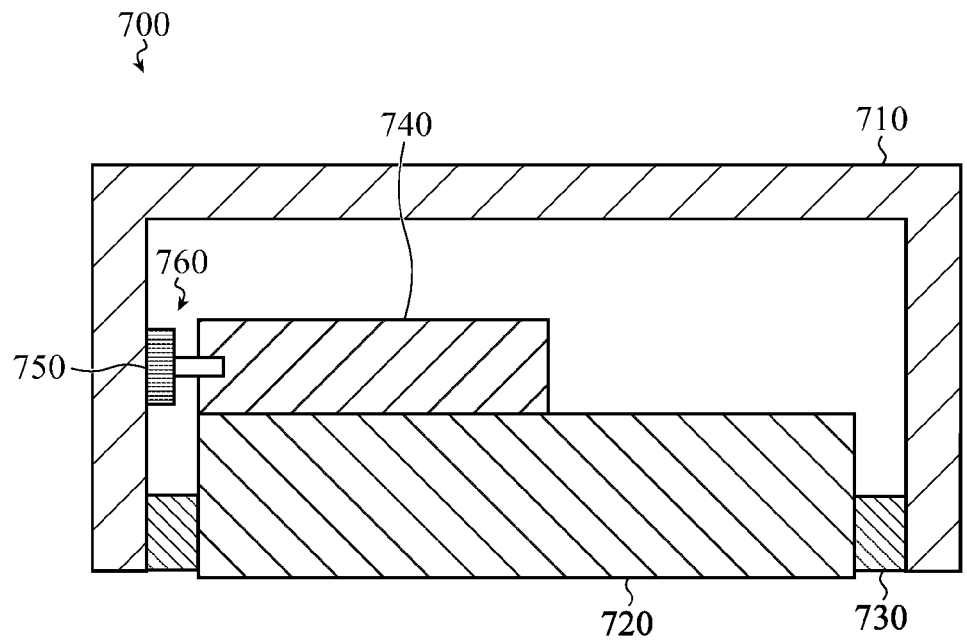
FIG. 7A shows a cross-section view of a rotatable input mechanism in a first state according to a third embodiment.

FIG. 7A shows a cross-section view of a rotatable input mechanism 700 in a first state according to a third embodiment. The rotatable input mechanism 700 includes a rotatable structure 710 that rotates around a base portion 720. The spacing between the rotatable structure 710 and the base portion 720 may be maintained by one or more bearings 730.

In this embodiment, an increase and decrease in friction, and as a result, the increase and decrease in the torque required to rotate the rotatable input mechanism 700, is controlled by an actuation mechanism 740. The actuation mechanism 740 may be an actuator, such as, for example, a linear actuator. The actuation mechanism 740 may be positioned on the base portion 720 of the rotatable input mechanism 700 such that an engagement surface 750 of a moveable mass 760 that extends from the actuation mechanism 740 may engage and disengage from an inner sidewall of the rotatable structure 710.

Figure 7B:
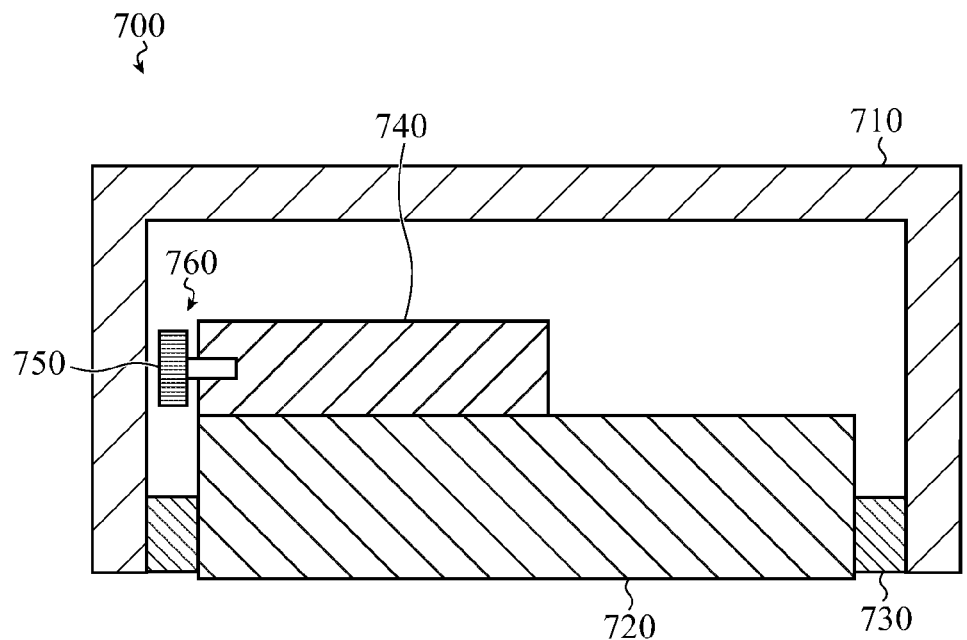
FIG. 7B shows a cross-section view of the rotatable input mechanism of FIG. 7A in a second state.

For example, in a nominal state such as shown in FIG. 7A, the engagement surface 750 of the moveable mass of the actuation mechanism 740 may be biased against, engage or otherwise contact a sidewall of the rotatable structure 710 in order to increase the amount of friction present in the rotatable input mechanism 700. The increase in friction increases the torque required to rotate the rotatable structure 710. The actuation mechanism 740 may dynamically vary the friction present in the rotatable input mechanism 700, for example, by increasing a force and/or a contact area between the cover (or other rotatable structure) and the engagement surface 750. When the actuation mechanism 740 is actuated, the engagement surface 750 of the moveable mass 760 disengages from the sidewall of the rotatable structure 710 (such as shown in FIG. 7B), thereby reducing the friction and the torque required to rotate the rotatable structure 710.

In some implementations, the actuation mechanism 740 may include a spring or other such component that enables the engagement surface 750 to engage and disengage from the sidewall of the rotatable structure 710. In some embodiments, as the engagement surface 750 engages and disengages from the sidewall, a haptic output resembling a "click" or other such haptic output may be provided to a user.

Although a single actuation mechanism 740 is shown, the rotatable input mechanism 700 may include any number of actuation mechanisms. Further, each actuation mechanism 740 may include multiple engagement surfaces 750 on various moveable masses. In addition and although the actuation mechanism 740 is shown in a horizontal orientation, the actuation mechanism 740 may be in a vertical position such that the engagement surface 750 of the moveable mass contacts the inner top surface of the rotatable structure 710.

In yet another embodiment, the actuation mechanism 740 and its associated moveable mass and engagement surface 750 may be positioned on the outside of the rotatable structure 710. In such implementations, the engagement surface 750 may contact and be removed from an outer surface of the rotatable structure 710. In still other implementations, a first actuation mechanism may be positioned on the outside of the rotatable structure 710 while a second actuation mechanism may be positioned on the inside of the rotatable structure 710.

Figure 8A:
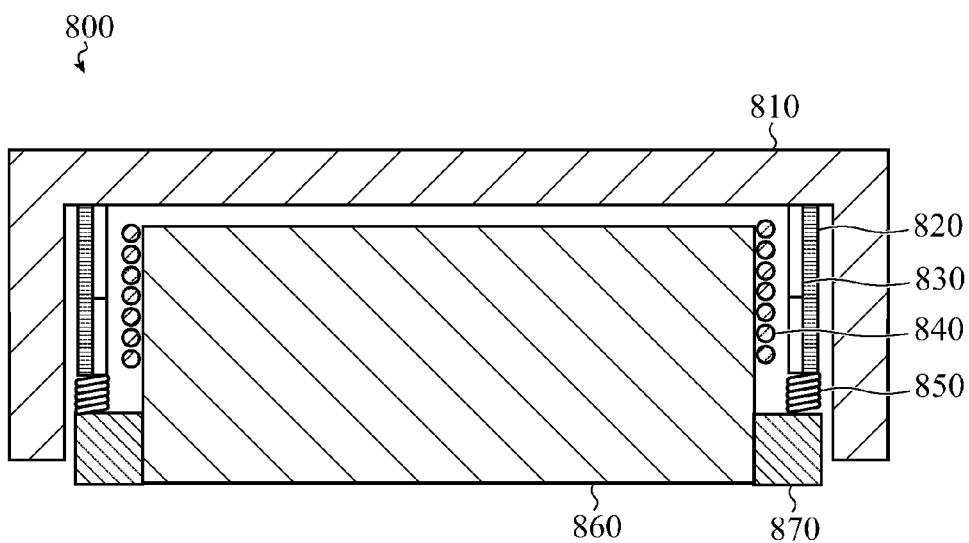
FIG. 8A shows a cross-section view of a rotatable input mechanism in a first state according to a fourth embodiment.

FIG. 8A shows a cross-section view of a rotatable input mechanism 800 in a first state according to a fourth embodiment. The rotatable input mechanism 800 includes a rotatable structure 810. Contained within the rotatable structure 810 is a magnet carrier 820 that enables the rotatable structure 810 to rotate around an axis. The rotatable input mechanism 800 also includes one or more electromagnets 830 coupled to the magnet carrier 820 and one or more coils 840.

In operation, when the coils 840 are activated, such as for example, in response to a received current or signal, the coils 840, in conjunction with the electromagnets 830, produce a magnetic flux. The magnetic flux causes the rotatable structure 810 to be attracted to (or repulsed from) the base portion 860 which increases or decreases the amount of friction present in the rotatable input mechanism 800.

Figure 8B:
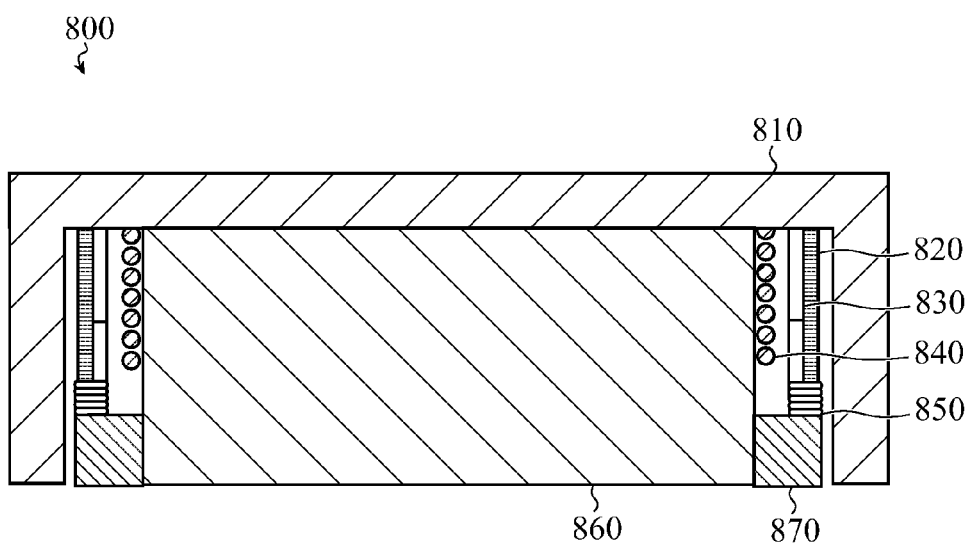
FIG. 8B shows a cross-section view of the rotatable input mechanism of FIG. 8A in a second state.

For example, the magnetic flux may cause the rotatable structure 810 to move from its nominal position to an upward position or a downward position (such as shown in FIG. 8B).

Movement of the rotatable structure 810 in such a manner may increase or decrease the amount of friction present and may also provide a haptic output. The rotatable input mechanism 800 may also include one or more spring components 850 that operate to move or otherwise assist the rotatable structure 810 in returning to its nominal position.

Like the other embodiments described herein, the rotatable input mechanism 800 may also include one or more bearings 870 that maintain spacing between the rotatable structure 810 and a base portion 860. In some embodiments, the base portion 860 may be omitted. In other implementations, the base portion 860 may include a friction surface to increase friction between the rotatable structure 810 and the base portion 860.

Figure 9A:
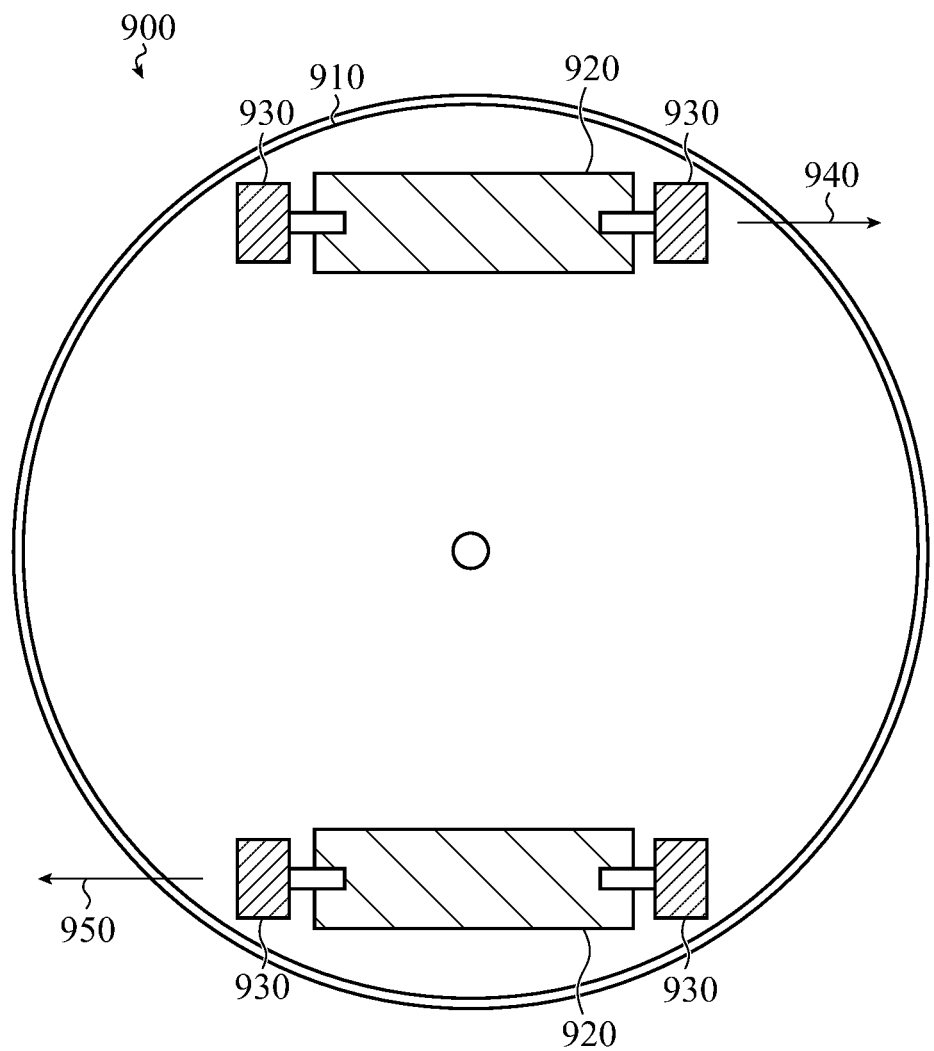
FIG. 9A illustrates a top-down cross-section view of a rotatable input mechanism in a first state according to a fifth embodiment.

FIG. 9A illustrates a top-down cross-section view of a rotatable input mechanism 900 in a first state according to a fifth embodiment. In this implementation, the rotatable input mechanism 900 includes a rotatable structure 910. Contained within the rotatable structure 910 are two actuation mechanisms 920. The actuation mechanisms 920 may each include a moveable mass 930. The actuation mechanisms 920 may be inertial linear actuators that create torque as the moveable mass 930 moves tangentially and impacts or otherwise comes into contact with an inner sidewall of the rotatable structure 910, although other actuators may be used.

Figure 9B:
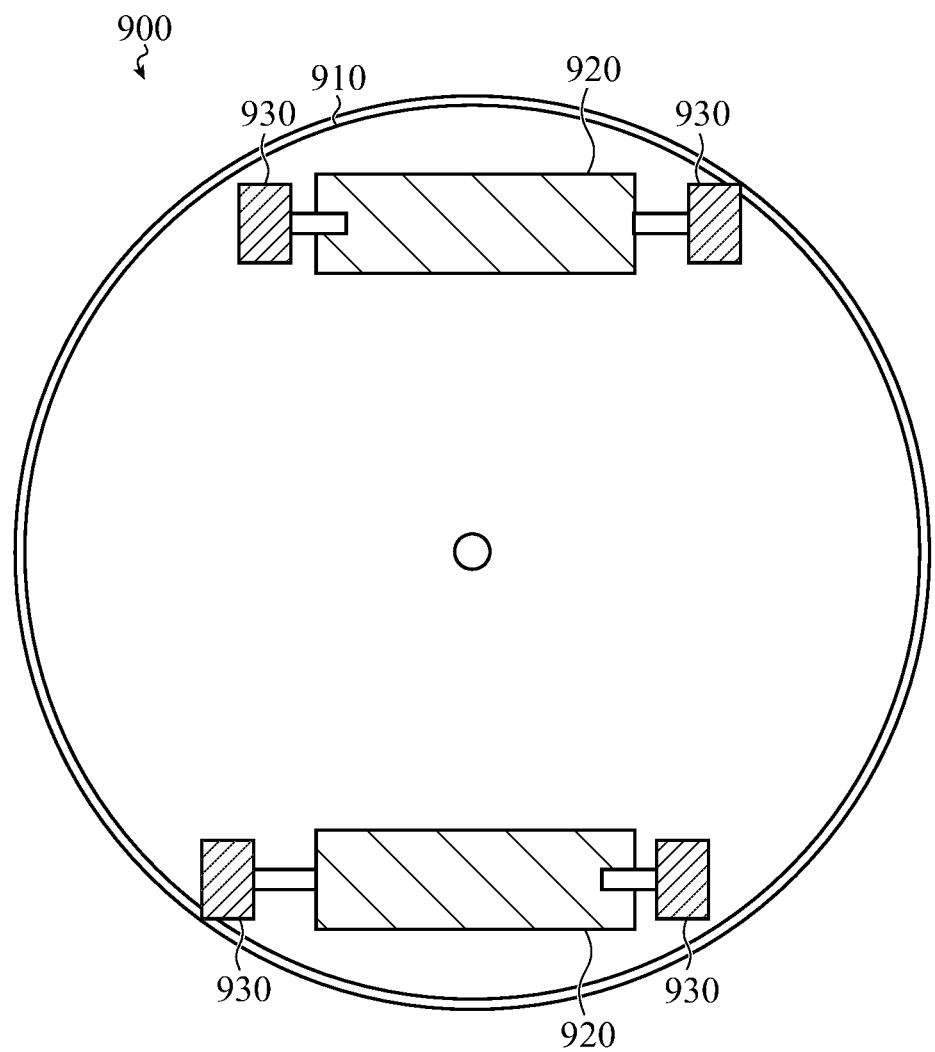
FIG. 9B shows a top-down cross-section view of the rotatable input mechanism of FIG. 9A in a second state.

More specifically, each actuation mechanism 920 converts lateral motion into torque when one of the actuation mechanisms 920 translates its moveable mass 930 (in the direction of arrow 940) and the other actuation mechanism 920 translates its moveable mass 930 (in the direction of arrow 950). Thus, each moveable mass contacts or otherwise engages a sidewall of the rotatable structure 910, as shown in FIG. 9B. Each actuation mechanism 920 may have multiple moveable masses 930. As such, each actuation mechanism 920 may actuate a first moveable mass 930 to generate torque in a clockwise rotation to provide a haptic output and subsequently actuate a second moveable mass to generate torque in a counterclockwise rotation, which may also produce a haptic output.

In some embodiments, both actuation mechanisms 920 may move their respective moveable masses 930 simultaneously or substantially simultaneously. In other implementations, the actuation mechanisms 920, and their respective moveable masses 930, may be actuated in a particular sequence. For example, a first moveable mass 930 of one of the actuation mechanisms 920 may be actuated at a first time and for a first time period, and a second moveable mass of the actuation mechanism 920 may be actuated at a second time for a second time period.

Although two actuation mechanisms 920 are shown and described, the rotatable input mechanism 900 may contain a single actuation mechanism 920 or more than two actuation mechanisms 920. In addition, the weights of the moveable masses 930 for each actuation mechanism 920 may be altered to change a haptic output provided by the rotatable input mechanism 900. In some embodiments, the actuation mechanisms 920 may be actuated at a rate that overcomes friction. As such, the rotatable input mechanism 900 may act as a free-spinning wheel.

Figure 10A:
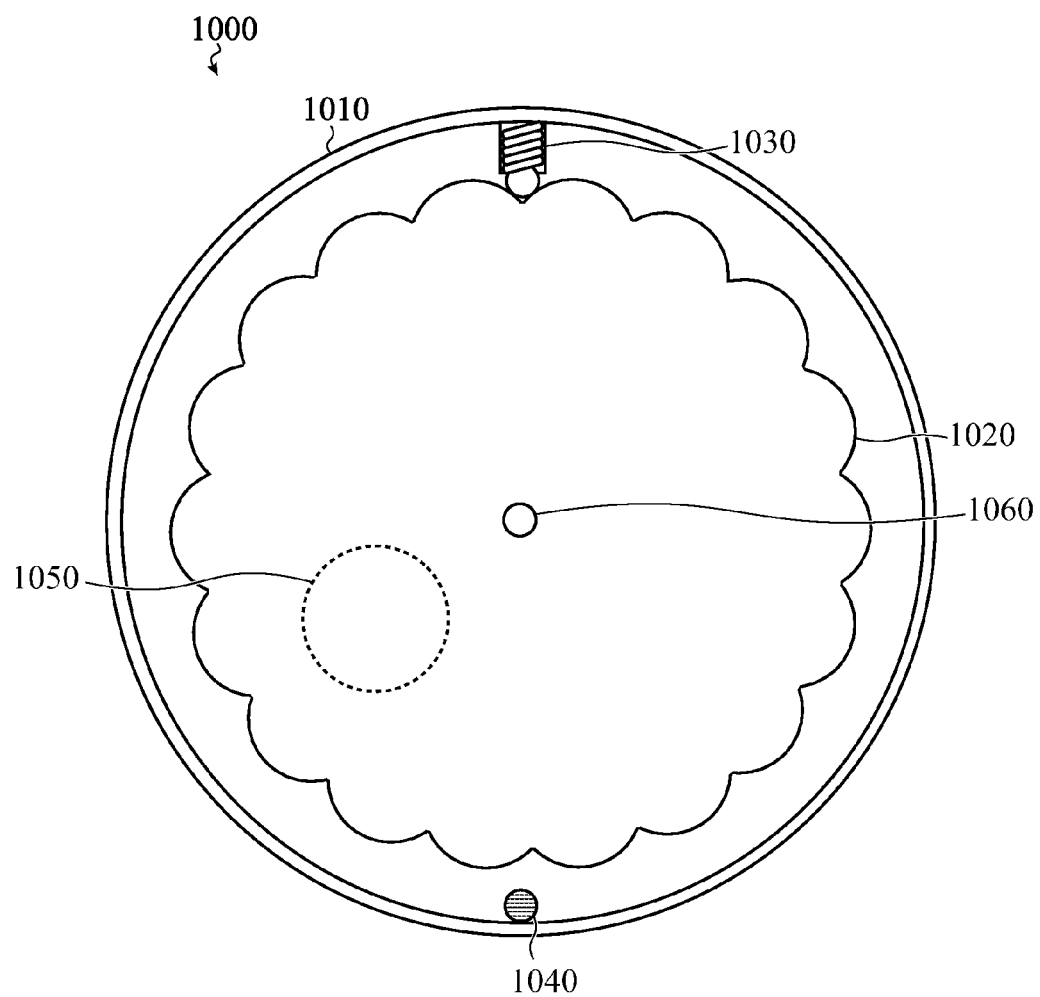
FIG. 10A illustrates a top-down cross-section view of a rotatable input mechanism in a first state according to a sixth embodiment.
Figure 10B:
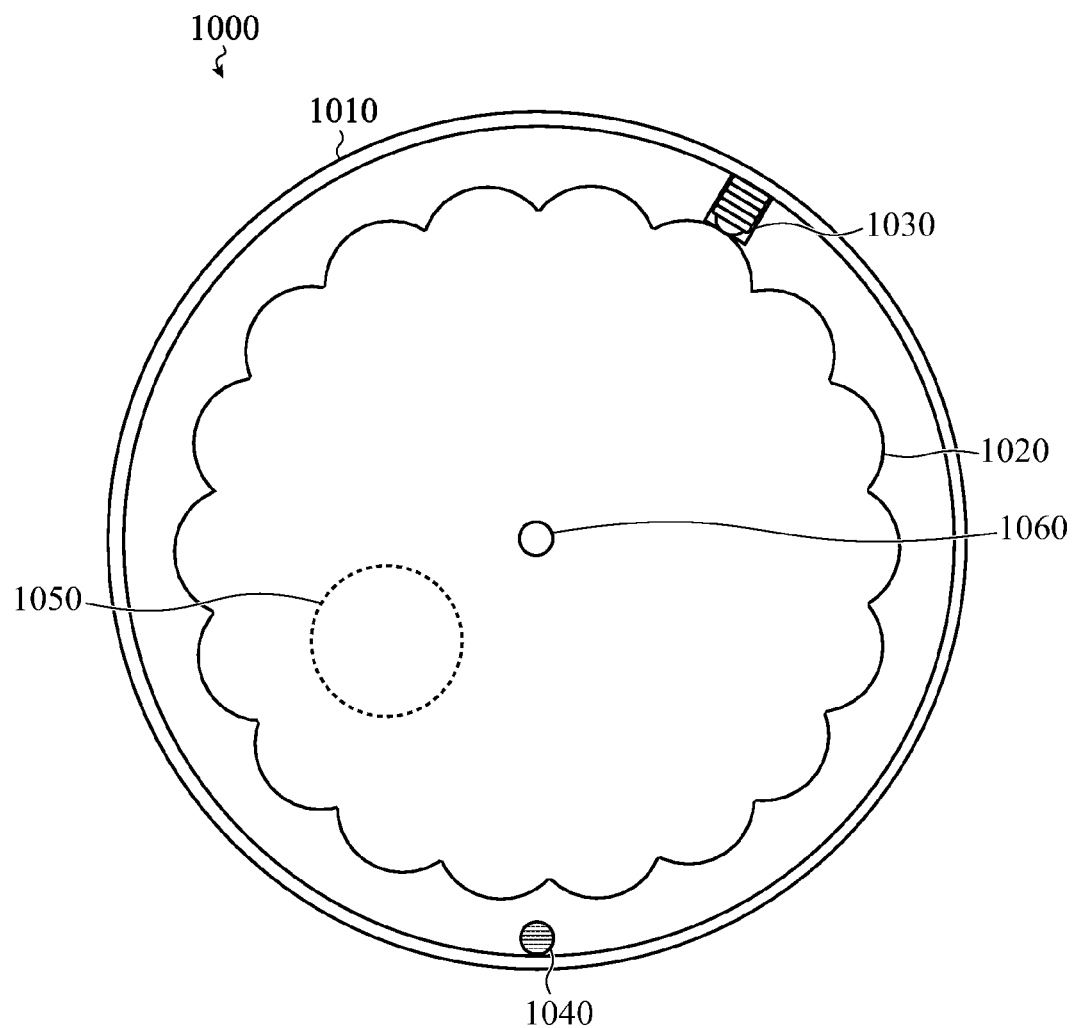
FIG. 10B shows a top-down cross-section view of the rotatable input mechanism of FIG. 10A in a second state.

FIG. 10A illustrates a top-down cross-section view of a rotatable input mechanism 1000 in a first state according to a sixth embodiment. The rotatable input mechanism 1000 includes a rotatable structure 1010 that is configured to rotate in the manner described above. The rotatable input mechanism 1000 also includes a rotating center plate 1020. The rotating center plate 1020 includes a number of detent features around a perimeter. The detent features interact with a ball and spring component 1030 (or other feedback mechanism) that is mounted on an inner surface of the rotatable structure 1010. For example, as the rotatable structure 1010 rotates (such as shown in FIG. 10B), the ball and spring component 1030 travels over the hills and valleys of the detent features of the rotating center plate 1020 to provide a haptic output.

The rotatable input mechanism 1000 may also include an encoder 1040, such as, for example, an optical encoder, that tracks, detects, or otherwise determines rotational movement of the rotatable input mechanism 1000 and/or the rotating center plate 1020. The encoder 1040 may be coupled to a base portion of the rotatable input mechanism 1000.

In operation, the rotating center plate 1020 may freely rotate with the rotatable structure 1010. In such implementations, haptic output is not provided as the ball and spring component 1030 does not travel over the detent features of the rotating center plate 1020. However, the rotatable input mechanism 1000 also includes an electromagnet 1050 that locks the rotating center plate 1020 in place in response to a received electric signal or electric current.

More specifically, when the electromagnet 1050 is not activated, the rotating center plate 1020 may freely rotate about shaft 1060 when the rotatable structure 1010 is rotated. When the electromagnet 1050 is activated, the electromagnet 1050 prevents the rotating center plate 1020 from rotating. As a result, the ball and spring component 1030 travels over the detent features of the rotating center plate 1020 and provides the haptic output when the rotatable structure 1010 is rotated.

Because the electromagnet 1050 may be selectively activated and deactivated, the frequency of the haptic output may be programmable or otherwise adjustable. For example, the electromagnet 1050 may be activated every 90 degrees that the rotatable structure 1010 is rotated. Thus, the haptic output is provided every quarter of a turn. In other implementations, the electromagnet 1050 may be activated every 15 degrees that the rotatable structure 1010 is rotated to provide an increased frequency of the haptic output.

In some embodiments, the encoder 1040 may track the speed of rotation of the rotating center plate 1020 and the degree of rotation of the rotating center plate 1020 and relay that information to a processing unit of the device in which the rotatable input mechanism 1000 is associated or integrated. The processing unit may then cause the electromagnet 1050 to be activated and deactivated accordingly to provide the desired haptic output.

Figure 11A:
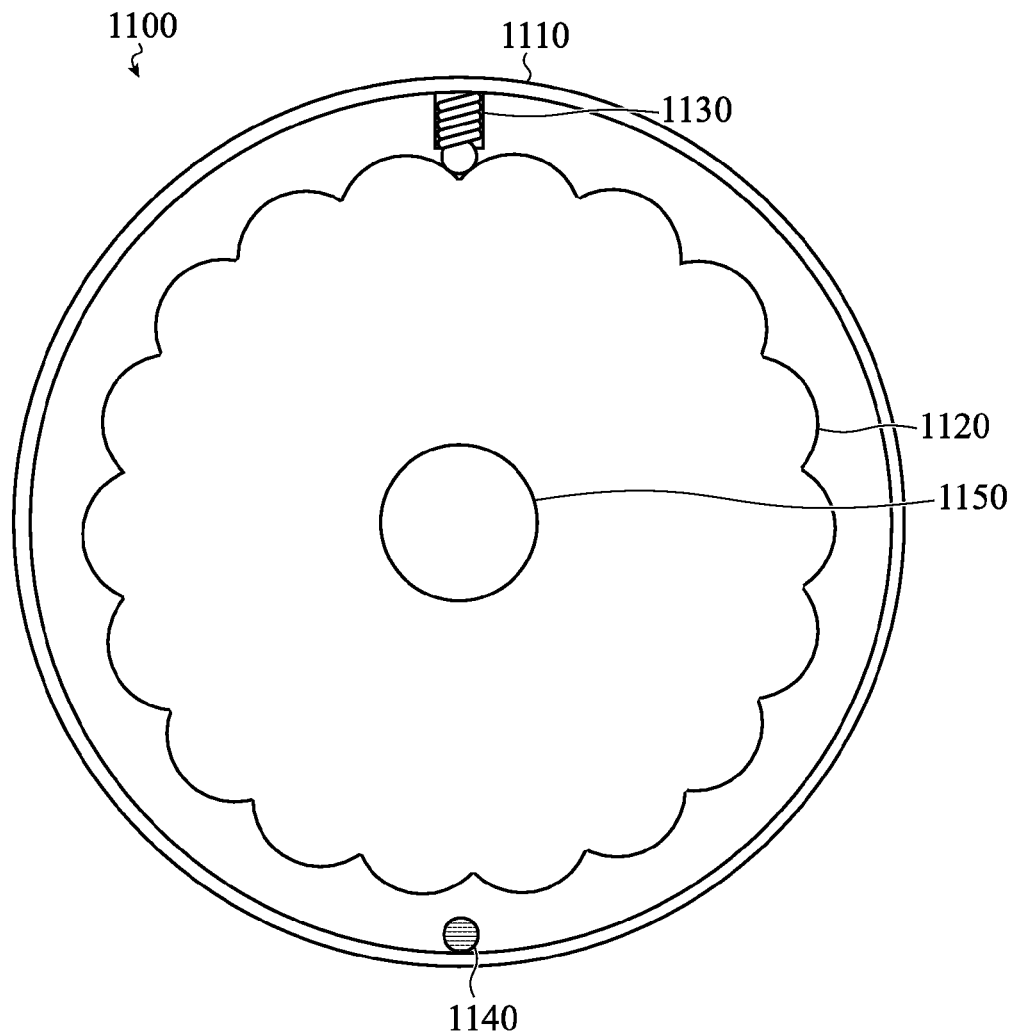
FIG. 11A illustrates a top-down cross-section view of a rotatable input mechanism in a first state according to a seventh embodiment.

FIG. 11A illustrates a top-down cross-section view of a rotatable input mechanism 1100 in a first state according to a seventh embodiment. The rotatable input mechanism 1100 may include similar components to the rotatable input mechanism 1000 (FIGS. 10A-10B) described above. For example, the rotatable input mechanism 1100 may include a rotatable structure 1110, a rotating center plate 1120 having various detent features, a ball and spring component 1130 or other such feedback mechanism that interacts with the detent features and an encoder 1140 coupled to a base portion of the rotatable input mechanism 1100. Each of these components may operate in a similar manner such as described above.

However, in this particular implementation, the rotatable input mechanism 1100 also includes a motor 1150 that rotates the rotating center plate 1120. The motor 1150 may rotate the rotating center plate 1120 in various directions. In some implementations, the motor 1150 may be coupled or otherwise be attached to a base portion of the rotatable input mechanism 1100. The motor 1150 may also include an encoder to track the rotation of the motor and/or the rotating center plate 1120.

Figure 11B:
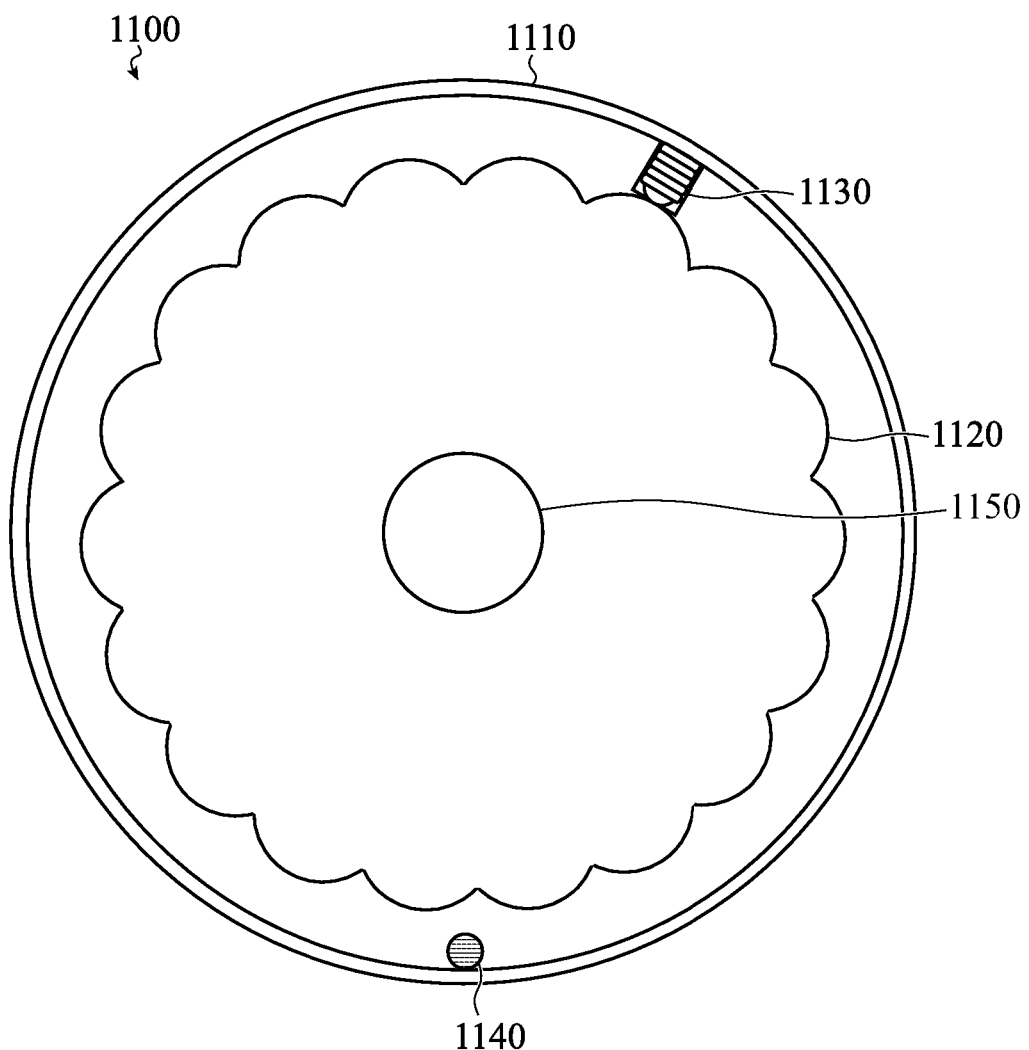
FIG. 11B shows a top-down cross-section view of the rotatable input mechanism of FIG. 11A in a second state.

The motor 1150 may rotate the rotating center plate 1120 in a direction and speed similar to the rotational direction and speed of the rotatable structure 1110. In other implementations, the motor 1150 may rotate the rotating center plate 1120 in a direction opposite from the direction of rotation of the rotatable structure 1110 to provide an increased frequency of the haptic output. For example, the rotatable structure 1110 may be rotated in a clockwise direction (such as shown in FIG. 11B) at a first speed, and the motor 1150 may rotate the rotating center plate 1120 in the clockwise direction at a second speed to provide a first frequency of haptic output. In other implementations, the rotatable structure 1110 may be rotated in a clockwise direction at the first speed, and the motor 1150 may rotate the rotating center plate 1120 in a counterclockwise direction at a second speed to increase the frequency of the haptic output. Accordingly, the frequency and type of the haptic output of the rotatable input mechanism 1100 may be entirely programmable or adjustable.

Figure 12A:
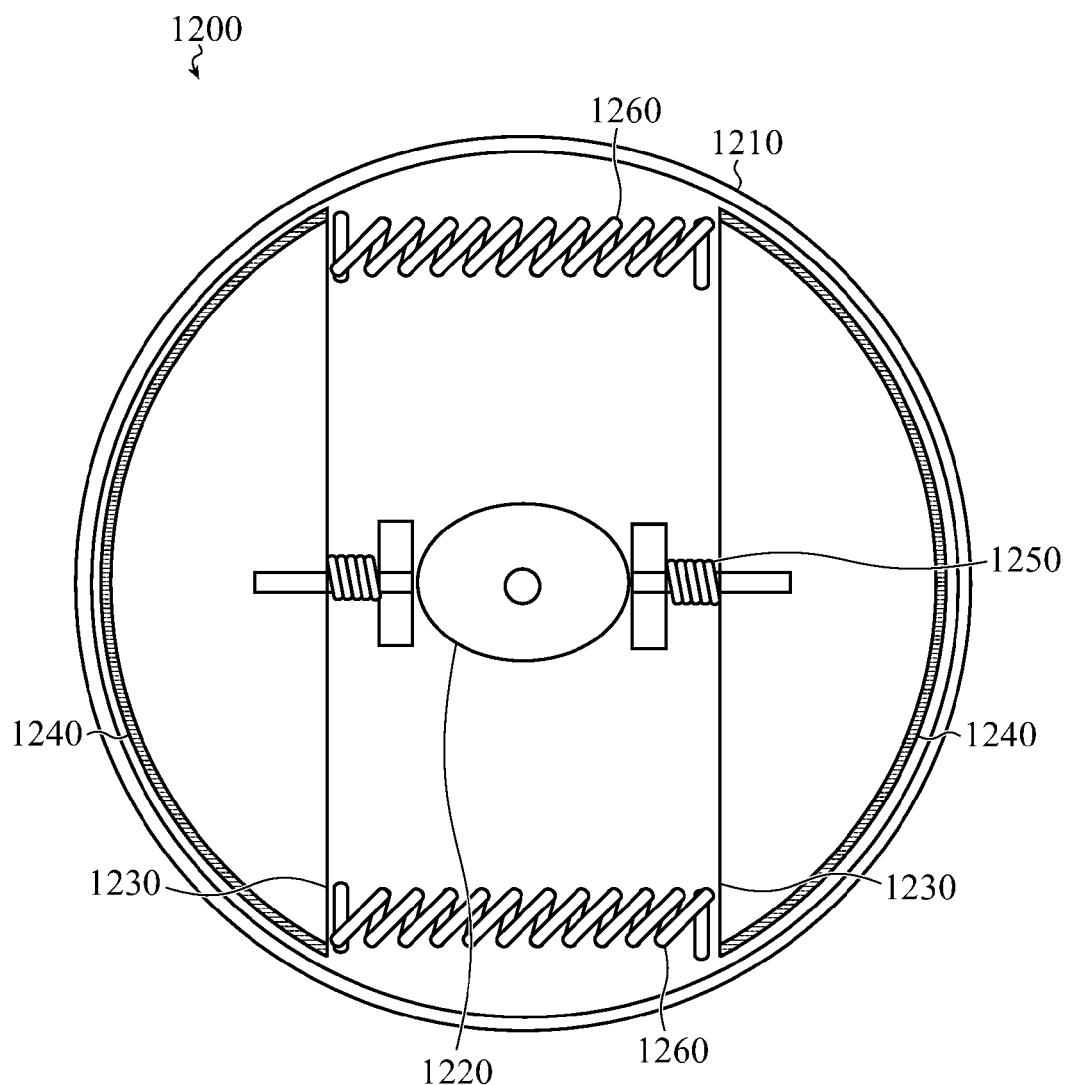
FIG. 12A illustrates a top-down cross-section view of a rotatable input mechanism in a first state according to an eighth embodiment.

FIG. 12A illustrates a top-down cross-section view of a rotatable input mechanism 1200 in a first state according to an eighth embodiment. The rotatable input mechanism 1200 includes a rotatable structure 1210 that may rotate in a clockwise and/or a counterclockwise direction. The rotatable input mechanism 1200 also includes a cam and motor 1220 that is coupled to moveable brake mechanisms 1230. In some embodiments, the moveable brake mechanisms 1230 may include an engagement surface 1240 that is configured to interact with inner surfaces of the rotatable structure 1210.

Figure 12B:
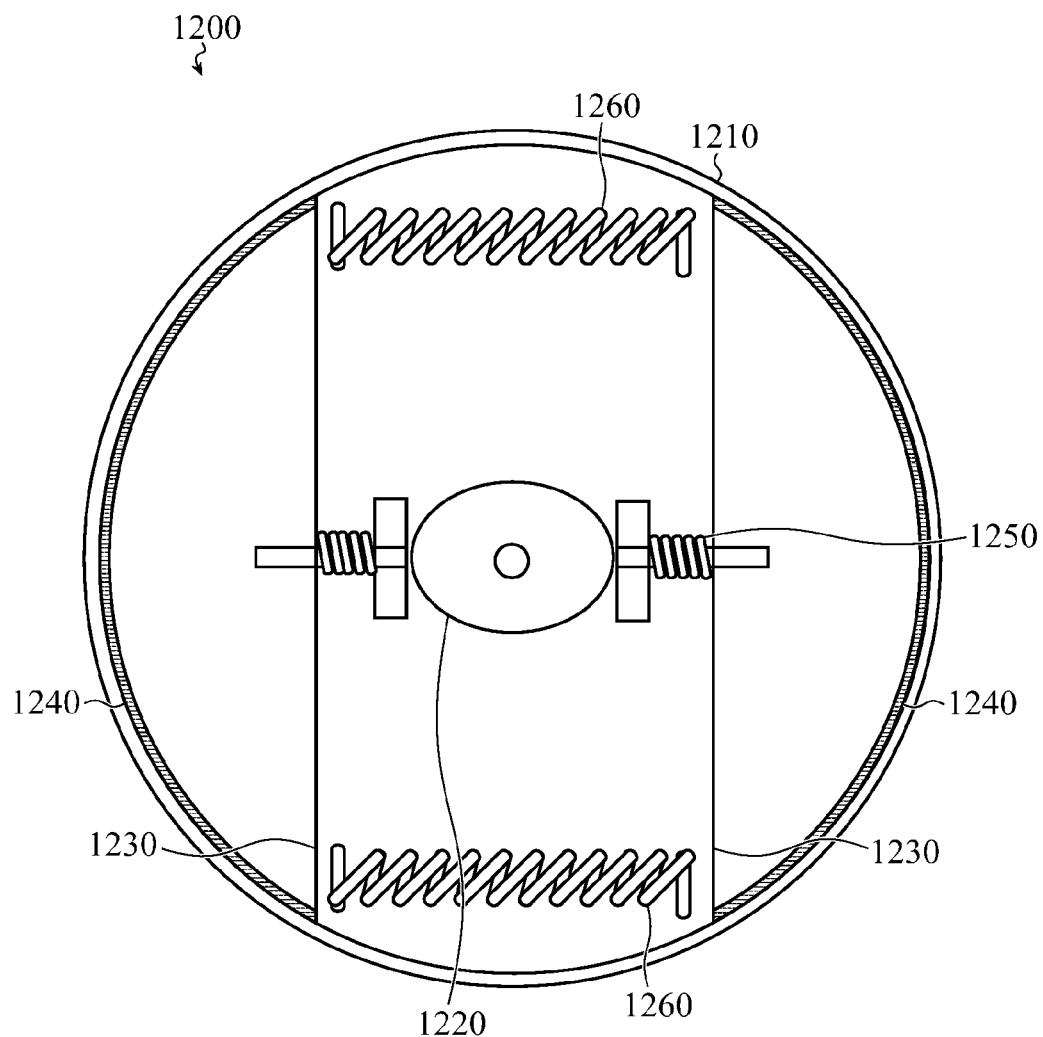
FIG. 12B shows a top-down cross-section view of the rotatable input mechanism of FIG. 12A in a second state.

For example, when the cam and motor 1220 is activated, the moveable brake mechanisms 1230 move from a first position (in which the moveable brake mechanisms 1230 are disengaged from the inner sidewall of the rotatable structure 1210) to a second position, in which the engagement surface 1240 of the moveable brake mechanisms 1230 engage the inner sidewall of the rotatable structure 1210 (such as shown in FIG. 12B). This may increase friction between the brake mechanisms and rotatable structure. Due to the increased friction, the torque required to rotate the rotatable input mechanism 1200 is increased.

In some embodiments, the cam and motor 1220 may be controllable such that the amount of friction provided by the moveable brake mechanisms 1230 is adjustable. For example, the amount of friction provided by the moveable brake mechanisms 1230 may vary from application to application.

The cam and motor 1220 also includes one or more return springs 1250 that are used to return the moveable brake mechanisms 1230 to their nominal state when friction is no longer needed and/or desired. In some embodiments, one or more stabilization mechanisms 1260 (e.g., stabilization springs) may be provided between the moveable brake mechanisms 1230 to maintain the positioning and the spacing of the moveable brake mechanisms 1230 with respect to one another.

Figure 13:
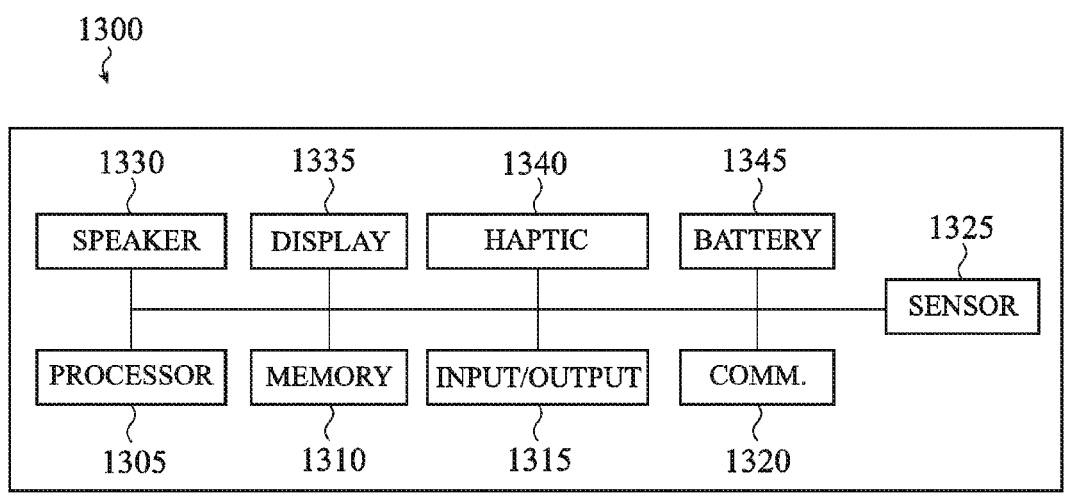
FIG. 13 illustrates example components of an electronic device that may use or incorporate the rotatable input mechanism described herein.

FIG. 13 illustrates example components of an electronic device 1300 that may use or incorporate a rotatable input mechanism such as described above. As shown in FIG. 13, the electronic device 1300 includes at least one processor 1305 or processing unit configured to access a memory 1310. The memory 1310 may have various instructions, computer programs, or other data stored thereon. The instructions may be configured to perform one or more of the operations or functions described with respect to the electronic device 1300. For example, the instructions may be configured to control or coordinate the operation of the display 1335, one or more input/output components 1315, actuation of the motor, electromagnets, and so on such as described above, one or more communication channels 1320, one or more sensors 1325, a speaker 1330, and/or one or more haptic actuators 1340.

The processor 1305 may be implemented as any electronic device capable of processing, receiving, or transmitting data or instructions. For example, the processor 1305 can be a microprocessor, a central processing unit (CPU), an application-specific integrated circuit (ASIC), a digital signal processor (DSP), or combinations of such devices.

The memory 1310 can store electronic data that can be used by the electronic device 1300. For example, the memory 1310 can store electrical data or content such as, for example, audio and video files, documents and applications, device settings and user preferences, timing and control signals or data for the various modules, data structures or databases, and so on. The memory 1310 may also store instructions for determining when the motor, the electromagnets and other components are activated, the direction and speed of travel and so on such as described above.

The memory 1310 may be any type of memory such as, for example, random access memory, read-only memory, Flash memory, removable memory, or other types of storage elements, or combinations of such devices.

The electronic device 1300 may include various input and output components represented in FIG. 13 as Input/Output 1315. Although the input and output components are represented as a single item, the electronic device 1300 may include a number of different input components, including buttons, input surfaces, microphones, switches, rotatable crowns, dials and other input mechanisms for accepting user input. The input and output components may include one or more touch sensors and/or force sensors. For example, the display 1335 may be comprised of a display stack that includes one or more touch sensors and/or one or more force sensors that enable a user to provide input to the electronic device 1300.

The electronic device 1300 may also include one or more communication channels 1320. These communication channels 1320 may include one or more wireless interfaces that provide communications between the processor 1305 and an external device or other electronic device. In general, the one or more communication channels 1320 may be configured to transmit and receive data and/or signals that may be interpreted by instructions executed on the processor 1305. In some cases, the external device is part of an external communication network that is configured to exchange data with other devices. Generally, the wireless interface may include, without limitation, radio frequency, optical, acoustic, and/or magnetic signals and may be configured to operate over a wireless interface or protocol. Example wireless interfaces include radio frequency cellular interfaces, fiber optic interfaces, acoustic interfaces, Bluetooth interfaces, Near Field Communication interfaces, infrared interfaces, USB interfaces, Wi-Fi interfaces, TCP/IP interfaces, network communications interfaces, or any conventional communication interfaces.

The electronic device 1300 may also include one or more sensors 1325. Although a single representation of a sensor 1325 is shown in FIG. 13, the electronic device 1300 may have many sensors. These sensors may include resistive sensors, light sensors, capacitive sensors, biometric sensors, temperature sensors, accelerometers, gyroscopes, barometric sensors, moisture sensors, and so on.

One or more acoustic modules or speakers 1330 may also be included in the electronic device 1300. The speaker 1330 may be configured to produce an audible sound or an acoustic signal.

As also shown in FIG. 13, the electronic device 1300 may include one or more haptic actuators 1340. The haptic actuators 1340 may be any type of haptic actuator including rotational haptic devices, linear haptic actuators, piezoelectric devices, vibration elements, and so on. The haptic actuator 1340 is configured to provide punctuated and distinct feedback to a user of the electronic device 1300. In some embodiments, the haptic actuator 1340 may work in conjunction with the rotatable input mechanisms described above to provide further distinctive haptic output. For example, the haptic actuator 1340 may be actuated at or near the same time that the rotatable input mechanisms described above provide or should provide haptic output. As a result, the strength or perceptibility of the haptic output may be increased.

In certain embodiments, the electronic device 1300 may include an internal battery 1345. The internal battery 1345 may be used to store and provide power to the various components and modules of the electronic device 1300 including the haptic actuator 1340. The battery 1345 may charge via a wireless charging system, although a wired charging system may also be used.

Various embodiments described herein disclose that in a nominal position, a spring mechanism biases a mass away from a friction surface. However, it is also contemplated that the spring mechanism may bias the mass against a friction surface. In such embodiments, when a magnetic component energizes, the magnetic component may exert a repulsive force on the mass, which causes the mass to be pushed away from the friction surface. In addition, the spring mechanisms in the embodiments described above may be configured to translate, compress, coil or uncoil as a result of the rotatable input mechanism rotating.

Although the above-described embodiments discuss rotatable input mechanisms, the various features disclosed herein may be used with linear input mechanisms (e.g., a button, a switch, or other mechanisms that slide, move, or are otherwise actuated in a linear manner). For example, as the linear input mechanism moves from a first position to a second position, one or more of the various components described above may selectively increase and decrease an amount of friction present in the linear input mechanism. As the amount of friction increases and decreases, an amount of force required to move the linear input mechanism may increase and decrease accordingly which may be used to simulate a haptic output of a linear input mechanism.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A rotatable input mechanism, comprising:
    a rotatable structure;
    a surface within the rotatable structure;
    a moveable mass; and
    an actuation mechanism that causes the moveable mass to alternately engage and disengage the surface, thereby dynamically changing a torque required to rotate the rotatable structure.

2. The rotatable input mechanism of claim 1, wherein the actuation mechanism is an electromagnet.

3. The rotatable input mechanism of claim 2, wherein the electromagnet has an annular shape.

4. The rotatable input mechanism of claim 1, wherein the actuation mechanism is a linear actuator.

5. The rotatable input mechanism of claim 1, further comprising a spring mechanism coupled to the moveable mass, the spring mechanism causing the moveable mass to alternately engage and disengage the surface.

6. The rotatable input mechanism of claim 1, wherein the moveable mass is operative to move about a perimeter of the actuation mechanism.

7. A user-manipulable rotatable input mechanism, comprising:
    a rotatable structure configured to rotate about an axis; and
    an actuation mechanism defining an engagement surface; wherein
        the engagement surface is configured to alternately contact and disengage from the rotatable structure, thereby varying friction between the engagement surface and the rotatable structure to provide a varying haptic output.

8. The user-manipulable rotatable input mechanism of claim 7, wherein the actuation mechanism dynamically varies the friction such that the varying haptic output is non-binary.

9. The user-manipulable rotatable input mechanism of claim 8, wherein the actuation mechanism electromagnetically varies an attraction between the rotatable structure and the engagement surface, thereby dynamically varying the friction.

10. The user-manipulable rotatable input mechanism of claim 7, further comprising a stabilization mechanism operative to stabilize the engagement surface.

11. The user-manipulable rotatable input mechanism of claim 7, wherein the actuation mechanism controls an output of a display associated with the user-manipulable rotatable input mechanism.

12. The user-manipulable rotatable input mechanism of claim 7, wherein the engagement surface is biased against an inner surface of the rotatable structure.

13. The user-manipulable rotatable input mechanism of claim 7, further comprising a bearing positioned between the rotatable structure and the actuation mechanism.

14. An input device, comprising:
    a cover;
    a feedback mechanism coupled to an inner surface of the cover; and
    a rotating center plate operable to rotate both with the cover and independently of the cover, and having one or more detents disposed on a perimeter that interact with the feedback mechanism to provide a variable haptic output.

15. The input device of claim 14, further comprising an optical encoder operative to detect at least one of a direction of rotation of the rotating center plate and a speed of rotation of the rotating center plate.

16. The input device of claim 14, wherein rotation of the cover manipulates a selector of a user interface associated with the input device.

17. The input device of claim 14, further comprising a motor operative to rotate the rotating center plate.

18. The input device of claim 14, wherein the rotating center plate is configured to rotate at multiple speeds.

19. The input device of claim 14, wherein the rotating center plate is rotatable in a first direction and the cover is rotatable in a second direction that is different from the first direction.

* * * * *